US012763483B2

(12) United States Patent
Yoshikawa et al.

(10) Patent No.: US 12,763,483 B2
(45) Date of Patent: Oct. 13, 2026

(54) RADIO WAVE CONTROL PLATE

(71) Applicant: KYOCERA Corporation, Kyoto (JP)

(72) Inventors: Hiromichi Yoshikawa, Yokohama (JP); Masamichi Yonehara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 21 days.

(21) Appl. No.: 19/106,407

(22) PCT Filed: Aug. 9, 2023

(86) PCT No.: PCT/JP2023/029154
§ 371 (c)(1),
(2) Date: Feb. 25, 2025

(87) PCT Pub. No.: WO2024/048233
PCT Pub. Date: Mar. 7, 2024

(65) Prior Publication Data
US 2026/0058369 A1 Feb. 26, 2026

(30) Foreign Application Priority Data
Aug. 29, 2022 (JP) ................................ 2022-136368

(51) Int. Cl.
*H01Q 15/00* (2006.01)
*H01Q 15/02* (2006.01)
*H01Q 3/46* (2006.01)

(52) U.S. Cl.
CPC ..... *H01Q 15/0026* (2013.01); *H01Q 15/0086* (2013.01); *H01Q 15/02* (2013.01); *H01Q 3/46* (2013.01)

(58) Field of Classification Search
CPC .. H01Q 3/46; H01Q 15/0006; H01Q 15/0013; H01Q 15/002; H01Q 15/0026; H01Q 15/0086; H01Q 15/02; H01Q 19/06
See application file for complete search history.

(56) References Cited

U.S. PATENT DOCUMENTS 6,054,952 A 4/2000 Shen et al.
2012/0075692 A1 3/2012 Baik et al.
(Continued)

FOREIGN PATENT DOCUMENTS

CN 209248207 U 8/2019
CN 110739551 A 1/2020
(Continued)

OTHER PUBLICATIONS

Satiro Da Silva et al., "Equivalent circuit model for analysis of frequency selective surfaces with ring and double concentric ring apertures", IET Microwaves, Antennas & Propagation, vol. 14 Iss 7, pp. 600-607, Jun. 10, 2020 (Jun. 10, 2020), XP006090545, ISSN: 1751-8725, DOI: 10.1049/IET-MAP.2019.0760.

*Primary Examiner* — Robert Karacsony
(74) *Attorney, Agent, or Firm* — Procopio, Cory, Hargreaves & Savitch LLP

(57) ABSTRACT

A radio wave control plate includes a plurality of unit structures arrayed in a first plane direction, and a reference conductor serving as a reference potential of the plurality of unit structures. Each of the plurality of unit structures includes a first resonant structure and a second resonant structure that are rotationally symmetric in the first plane direction, each of the first resonant structure and the second resonant structure including a first resonator extending in the first plane direction and second resonators formed on the same plane as the first resonator and electromagnetically connected to the reference conductor. The first resonant structure and the second resonant structure are spaced apart from each other in a first direction such that the first resonator and the second resonators of the first resonant structure correspondingly face the first resonator and the second resonators of the second resonant structure.

16 Claims, 27 Drawing Sheets

(56) References Cited

U.S. PATENT DOCUMENTS

| | | | |
|---|---|---|---|
| 2016/0172750 | A1 | 6/2016 | Ng et al. |
| 2018/0109002 | A1 | 4/2018 | Foo |
| 2018/0316090 | A1 | 11/2018 | Foo |
| 2019/0044244 | A1 | 2/2019 | Kristou et al. |
| 2019/0260135 | A1 | 8/2019 | Kasahara |
| 2019/0296429 | A1 | 9/2019 | Hariza |
| 2020/0411954 | A1 | 12/2020 | Jia |
| 2021/0028545 | A1 | 1/2021 | Choi et al. |
| 2021/0257742 | A1 | 8/2021 | Wu et al. |
| 2023/0327334 | A1 | 10/2023 | Hiramatsu et al. |

FOREIGN PATENT DOCUMENTS

| | | | |
|---|---|---|---|
| JP | 2005354595 | A | 12/2005 |
| JP | 2015-231182 | A | 12/2015 |
| JP | 2021-057722 | A | 4/2021 |
| JP | 2021525463 | A | 9/2021 |
| JP | 2022-039867 | A | 3/2022 |
| JP | 2022-165403 | A | 10/2022 |
| KR | 10-2012-0031735 | A | 4/2012 |
| KR | 10-2012-0070498 | A | 6/2012 |
| KR | 10-2017-0098074 | A | 8/2017 |
| KR | 10-2021-0012418 | A | 2/2021 |

RADIO WAVE CONTROL PLATE

TECHNICAL FIELD

The present disclosure relates to a radio wave control plate.

BACKGROUND OF INVENTION

A known technique includes controlling electromagnetic waves without using a dielectric lens. For example, Patent Document 1 describes a technique of refracting radio waves in a structure including an array of resonator elements by changing parameters of the respective resonator elements.

CITATION LIST

Patent Literature

Patent Document 1: JP 2015-231182 A

SUMMARY

A radio wave control plate according to the present disclosure includes a plurality of unit structures arrayed in a first plane direction, and a reference conductor serving as a reference potential of the plurality of unit structures, in which each of the plurality of unit structures includes a first resonant structure and a second resonant structure being rotationally symmetric in the first plane direction, each of the first resonant structure and the second resonant structure including a first resonator extending in the first plane direction and second resonators formed on the same plane as the first resonator and electromagnetically connected to the reference conductor, and the first resonant structure and the second resonant structure are spaced apart from each other in a first direction, and the first resonator and the second resonators of the first resonant structure correspondingly face the first resonator and the second resonators of the second resonant structure.

A radio wave control plate according to the present disclosure includes a plurality of unit structures arrayed in a first plane direction, and a reference conductor serving as a reference potential of the plurality of unit structures, in which each of the plurality of unit structures includes a first resonant structure and a second resonant structure, each of the first resonant structure and the second resonant structure including a λ/2 resonator extending in the first plane direction and λ/4 resonators formed on the same plane as the λ/2 resonator and electromagnetically connected to the reference conductor, and the first resonant structure and the second resonant structure are spaced apart from each other in a first direction, and the λ/2 resonator and the λ/4 resonators of the first resonant structure correspondingly face the λ/2 resonator and the λ/4 resonators of the second resonant structure.

A radio wave control plate according to the present disclosure includes a plurality of unit structures arrayed in a first plane direction, and a reference conductor serving as a reference potential of the plurality of unit structures, in which each of the plurality of unit structures includes a first resonant structure and a second resonant structure, each of the first resonant structure and the second resonant structure including a λ/2 resonator extending in the first plane direction and λ/4 resonators formed on the same plane as the λ/2 resonator and electromagnetically connected to the reference conductor, the first resonant structure and the second resonant structure are spaced apart from each other in a first direction, and the λ/2 resonator and the λ/4 resonators of the first resonant structure correspondingly face the λ/2 resonator and the λ/4 resonators of the second resonant structure, and the radio wave control plate has four resonant frequencies, including a first resonant frequency, a second resonant frequency, a third resonant frequency, and a fourth resonant frequency in order from a low frequency side, and is configured to form a pass band of a bandpass filter by generating two attenuation poles between the third resonant frequency and the fourth resonant frequency.

A radio wave control plate according to the present disclosure includes a plurality of unit structures arrayed in a first plane direction, and a reference conductor serving as a reference potential of the plurality of unit structures, in which each of the plurality of unit structures includes a first resonant structure and a second resonant structure, each of the first resonant structure and the second resonant structure including a λ/2 resonator extending in the first plane direction and λ/4 resonators formed on the same plane as the λ/2 resonator and electromagnetically connected to the reference conductor, the first resonant structure and the second resonant structure are spaced apart from each other in a first direction, and the λ/2 resonator and the λ/4 resonators of the first resonant structure correspondingly face the λ/2 resonator and the λ/4 resonators of the second resonant structure, and the radio wave control plate has four resonant frequencies, including a first resonant frequency, a second resonant frequency, a third resonant frequency, and a fourth resonant frequency in order from a low frequency side, and is configured to form a pass band of a bandpass filter by generating two attenuation poles between the first resonant frequency and the third resonant frequency.

A radio wave control plate according to the present disclosure includes a plurality of first unit structures arrayed in a first plane direction, a plurality of second unit structures arrayed in the first plane direction, and a reference conductor serving as a reference potential of the plurality of first unit structures and the plurality of second unit structures, in which each of the plurality of first unit structures includes a first resonant structure and a second resonant structure, each of the first resonant structure and the second resonant structure including a λ/2 resonator extending in the first plane direction and λ/4 resonators formed on the same plane as the λ/2 resonator and electromagnetically connected to the reference conductor, the first resonant structure and the second resonant structure are spaced apart from each other in a first direction, and the λ/2 resonator and the λ/4 resonators of the first resonant structure correspondingly face the λ/2 resonator and the λ/4 resonators of the second resonant structure, each of the plurality of second unit structures includes a first patch conductor and a second patch conductor extending in the first plane direction, and the first patch conductor and the second patch conductor are spaced apart from and face each other in the first direction.

DESCRIPTION OF EMBODIMENTS

In the following, embodiments of the present invention will be described in detail with reference to the accompanying drawings. The present invention is not limited to the embodiments, and in the following embodiments, the same reference signs are assigned to the same portions and redundant descriptions thereof will be omitted.

In the following description, an XYZ orthogonal coordinate system is set, and the positional relationship between respective portions will be described by referring to the XYZ orthogonal coordinate system. A direction parallel to an X axis in a horizontal plane is defined as an X axis direction, a direction parallel to a Y axis orthogonal to the X axis in the horizontal plane is defined as a Y axis direction, and a direction parallel to a Z axis orthogonal to the horizontal plane is defined as a Z axis direction. A plane including the X-axis and the Y-axis is appropriately referred to as an XY plane, a plane including the X-axis and the Z-axis is appropriately referred to as an XZ plane, and a plane including the Y-axis and the Z-axis is appropriately referred to as a YZ plane. The XY plane is parallel to the horizontal plane. The XY plane, the XZ plane, and the YZ plane are orthogonal to each other.

First Embodiment

Radio Wave Refracting Plate

Figure 1:
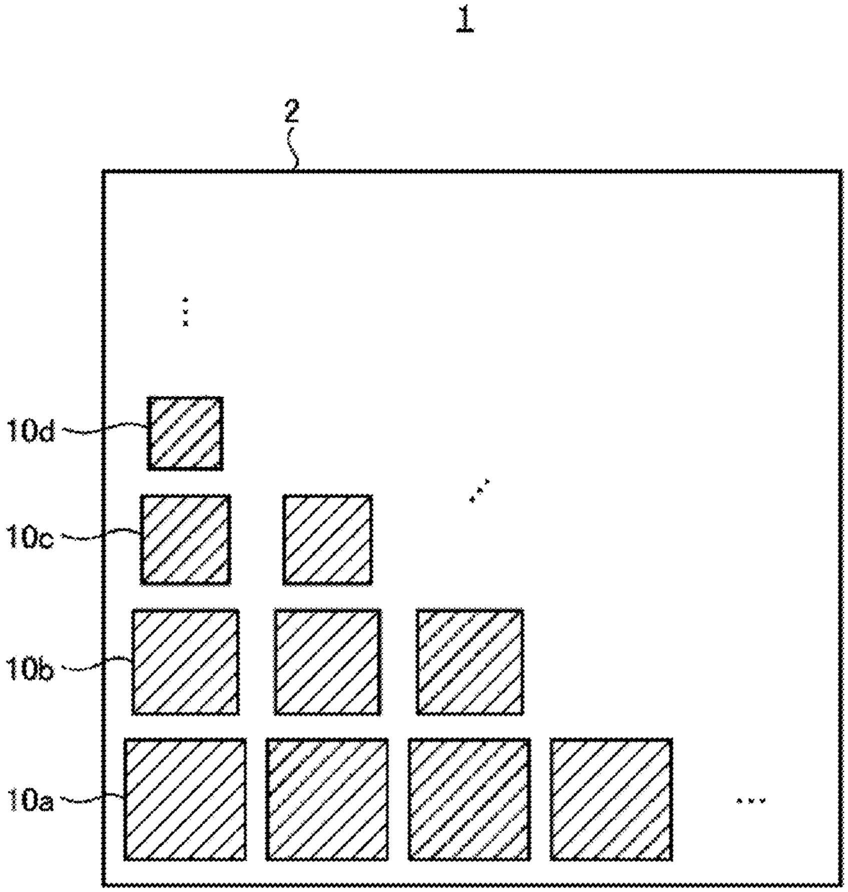
FIG. 1 is a diagram illustrating an overview of a radio wave refracting plate according to a first embodiment.

An overview of a radio wave refracting plate according to a first embodiment will be described with reference to FIG. 1. FIG. 1 is a diagram illustrating the overview of the radio wave refracting plate according to the first embodiment.

A radio wave refracting plate 1 is a plate-shaped member configured to be permeable to the radio wave transmitted from a base station. For example, the radio wave refracting plate 1 is configured to refract a radio wave at a predetermined angle and emit a refracted radio wave upon receipt of the radio wave transmitted from the base station. The radio wave refracting plate 1 may be made of, for example, a metamaterial that changes a phase of an incident wave. The radio wave refracting plate 1 is a kind of a radio wave control plate.

As illustrated in FIG. 1, the radio wave refracting plate 1 may include a substrate 2, unit structures 10*a*, unit structures 10*b*, unit structures 10*c*, and unit structures 10*d*.

The unit structures 10*a*, the unit structures 10*b*, the unit structures 10*c*, and the unit structures 10*d* may be formed on the substrate 2. The substrate 2 may be, for example, a dielectric substrate made of a dielectric body. The substrate 2 may have a rectangular shape, for example, but is not limited thereto. The unit structures 10*a*, the unit structures 10*b*, the unit structures 10*c*, and the unit structures 10*d* may be two dimensionally arrayed on the substrate 2.

Specifically, on the substrate 2, a plurality of unit structures 10*a* may be arranged in a line in the bottom row of the substrate 2. On the substrate 2, a plurality of unit structures 10*b* may be arranged in a line above the row where the unit structures 10*a* are arranged. On the substrate 2, a plurality of unit structures 10*c* may be arranged in a line above the row where the unit structures 10*b* are arranged. On the substrate 2, a plurality of unit structures 10*d* may be arranged in a line above the row where the unit structures 10*c* are arranged. That is, the radio wave refracting plate 1 may have a structure in which a plurality of unit structures having different sizes are periodically arrayed. The unit structures 10*a* to 10*d* may be different from each other in a frequency band and a change amount in a phase of the radio wave to be changed. The unit structures 10*a* to 10*d* have the rectangular shapes, but are not limited thereto. The frequency band and the change amount in a phase of the radio wave to be refracted can be adjusted by varying the sizes and shapes of the unit structure 10*a*, the unit structure 10*b*, the unit structure 10*c*, and the unit structure 10*d*.

Unit Structure

Figure 2:
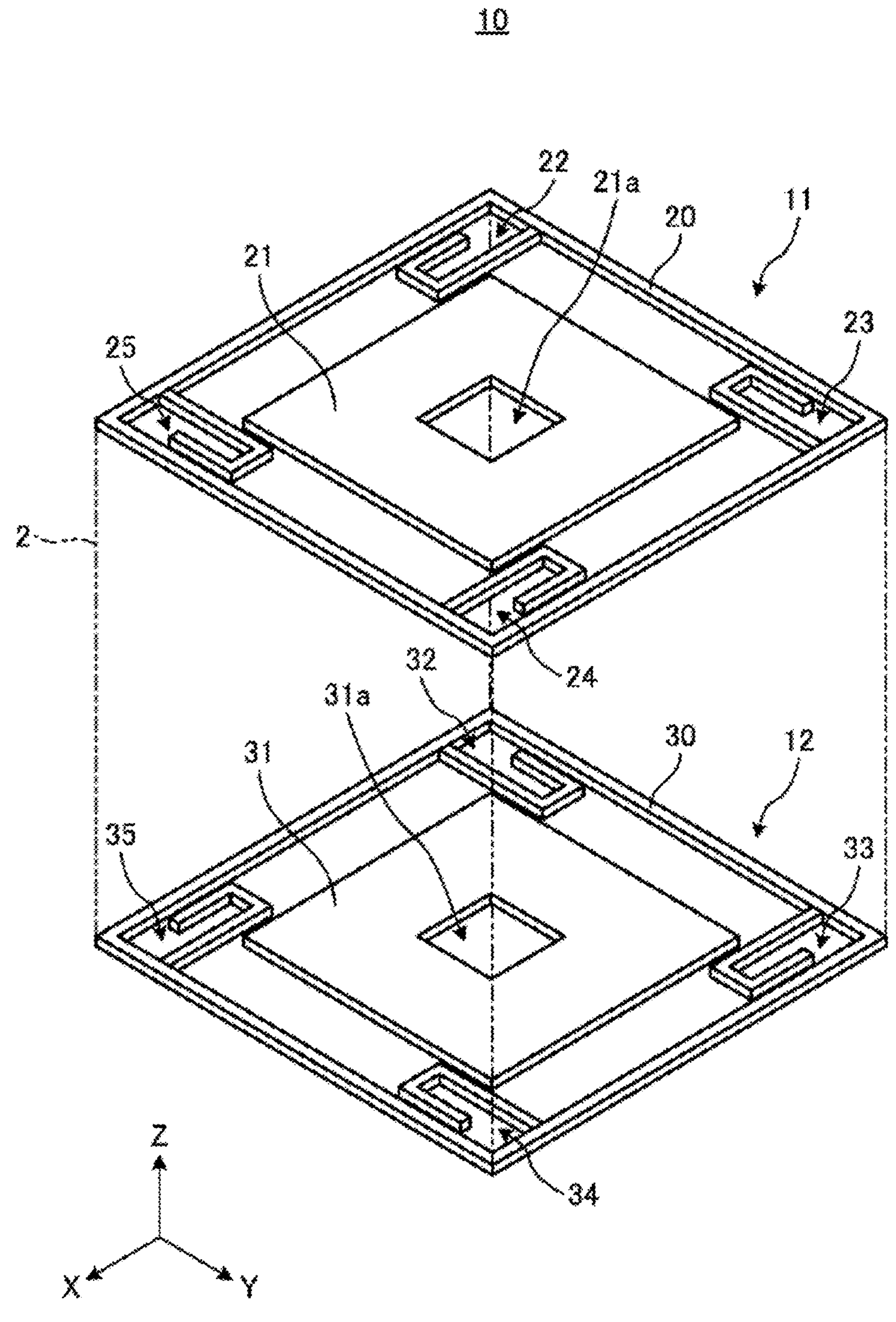
FIG. 2 is a diagram illustrating a configuration example of a unit structure according to the first embodiment.

FIG. 2 describes a configuration example of a unit structure according to the first embodiment. FIG. 2 is a diagram illustrating the configuration example of the unit structure according to the first embodiment.

A unit structure 10 includes the substrate 2, a first resonant structure 11, and a second resonant structure 12. The unit structure 10 has a two-layer structure in which two resonant structures are layered in two layers. The first resonant structure 11 and the second resonant structure 12 are placed to face each other with a space therebetween in a Z direction. The Z direction is a type of a first direction.

The first resonant structure 11 may be formed in a rectangular shape. The shape of the first resonant structure 11 is not limited to the rectangular shape. The first resonant structure 11 includes a reference conductor 20, a first resonator 21, a second resonator 22, a second resonator 23, a second resonator 24, and a second resonator 25.

The second resonant structure 12 may be formed in a rectangular shape. The shape of the second resonant structure 12 is not limited to the rectangular shape. The second resonant structure 12 includes a reference conductor 30, a first resonator 31, a second resonator 32, a second resonator 33, a second resonator 34, and a second resonator 35.

The reference conductor 20 and the reference conductor 30 face each other. The first resonator 21 and the first resonator 31 face each other. The second resonator 22 and the second resonator 32 face each other. The second resonator 23 and the second resonator 33 face each other. The second resonator 24 and the second resonator 34 face each other. The second resonator 25 and the second resonator 35 face each other.

Resonant Structure

Figure 3:
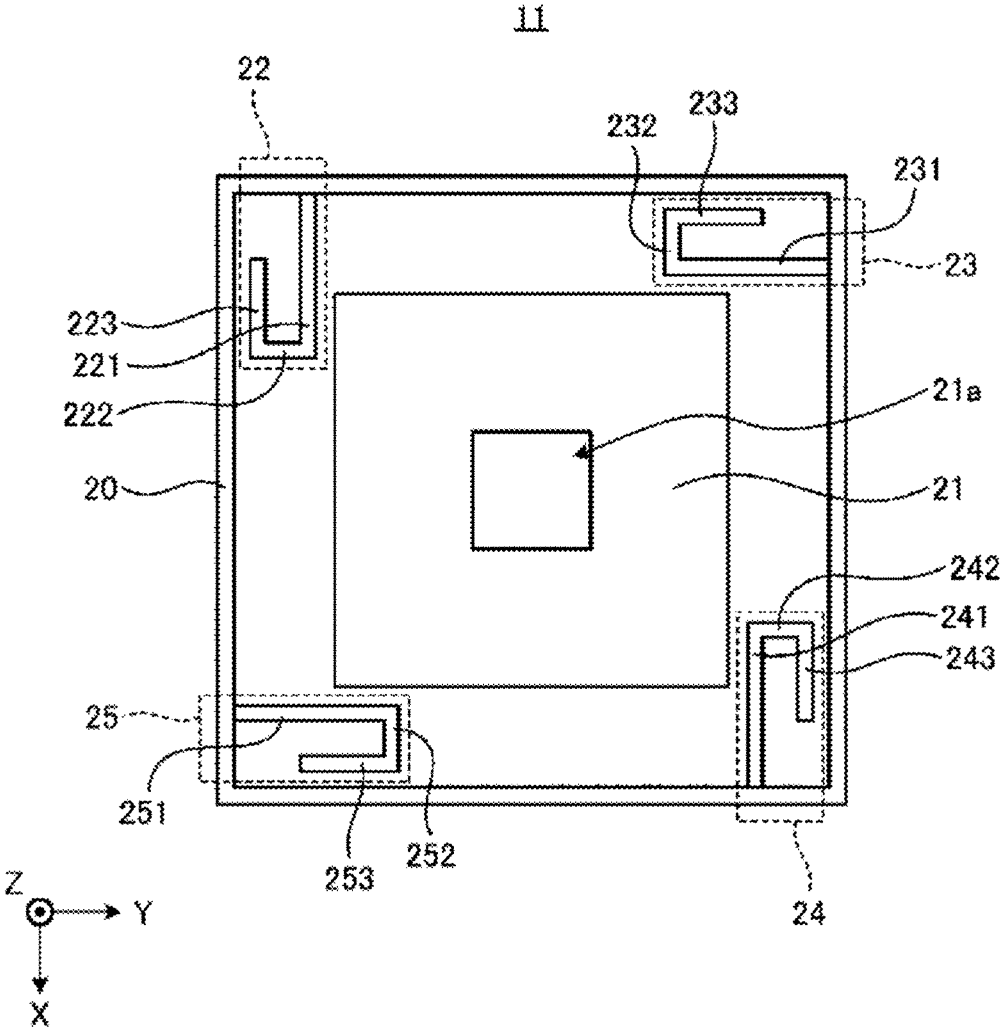
FIG. 3 is a diagram illustrating a configuration example of a first resonant structure according to the first embodiment.

A configuration example of the first resonant structure according to the first embodiment will be described with reference to FIG. 3. FIG. 3 is a diagram illustrating the configuration example of the first resonant structure according to the first embodiment.

In the first resonant structure 11, the reference conductor 20, the first resonator 21, the second resonator 22, the second resonator 23, the second resonator 24, and the second resonator 25 are formed on the same XY plane.

The reference conductor 20 is formed in a rectangular frame shape extending on an XY plane. The shape of the reference conductor 20 is not limited thereto. The reference conductor 20 is formed so as to surround the first resonator 21, the second resonator 22, the second resonator 23, the second resonator 24, and the second resonator 25. The reference conductor 20 is electromagnetically connected to a reference potential. The reference potential is ground, but not limited thereto.

The first resonator 21 is made of a conductor. The first resonator 21 is formed, for example, in a center portion of the inner circumference of the reference conductor 20. The first resonator 21 is formed on the XY plane. The first resonator 21 is not electromagnetically connected to the reference conductor 20. That is, the first resonator 21 serves as a $\lambda/2$ resonator. The first resonator 21 is, for example, a rectangular patch conductor extending on the XY plane, but is not limited thereto. The first resonator 21 has a hole 21*a* in a center portion thereof. The first resonator 21 may not have the hole 21*a*. By adjusting a size of the hole 21*a* of the first resonator 21, a capacitance value of the first resonant structure 11 can be adjusted.

The second resonator 22 is made of a conductor. The second resonator 22 is formed, for example, in an upper left corner portion of the inner circumference of the reference conductor 20. The second resonator 22 is formed on the XY plane. The second resonator 22 includes a first conductor section 221, a second conductor section 222, and a third conductor section 223. One end of the first conductor section 221 is electromagnetically connected to an upper side of the reference conductor 20. The first conductor section 221 extends in a +X direction. The other end of the first conductor section 221 is bent parallel to a Y direction to form the second conductor section 222. The second conductor section 222 extends in a −Y direction. A tip of the second conductor section 222 is bent parallel to an X direction to form the third conductor section 223. The third conductor section 223 extends in a −X direction. A tip of the third conductor section 223 is not electromagnetically connected to the reference conductor 20. The second resonator 22 serves as a $\lambda/4$ resonator.

The second resonator 23 is made of a conductor. The second resonator 23 is formed, for example, in an upper right corner portion of the inner circumference of the reference conductor 20. The second resonator 23 is formed on the XY plane. The second resonator 23 includes a first conductor section 231, a second conductor section 232, and a third conductor section 233. One end of the first conductor section 231 is electromagnetically connected to a right side of the reference conductor 20. The first conductor section 231 extends in the −Y direction. The other end of the first conductor section 231 is bent parallel to the X direction to form the second conductor section 232. The second conductor section 232 extends in the −X direction. A tip of the second conductor section 232 is bent parallel to the Y direction to form the third conductor section 233. The third conductor section 233 extends in a +Y direction. A tip of the third conductor section 233 is not electromagnetically connected to the reference conductor 20. The second resonator 23 serves as a $\lambda/4$ resonator.

The second resonator 24 is made of a conductor. The second resonator 24 is formed, for example, in a lower right corner portion of the inner circumference of the reference conductor 20. The second resonator 24 is formed on the XY plane. The second resonator 24 includes a first conductor section 241, a second conductor section 242, and a third conductor section 243. One end of the first conductor section 241 is electromagnetically connected to a lower side of the reference conductor 20. The first conductor section 241 extends in the −X direction. The other end of the first conductor section 241 is bent parallel to the Y direction to form the second conductor section 242. The second conductor section 242 extends in the +Y direction. A tip of the second conductor section 242 is bent parallel to the X direction to form the third conductor section 243. The third conductor section 243 extends in the +X direction. A tip of the third conductor section 243 is not electromagnetically connected to the reference conductor 20. The second resonator 24 serves as a λ/4 resonator.

The second resonator 25 is made of a conductor. The second resonator 25 is formed, for example, in a lower left corner portion of the inner circumference of the reference conductor 20. The second resonator 25 is formed on the XY plane. The second resonator 25 includes a first conductor section 251, a second conductor section 252, and a third conductor section 253. One end of the first conductor section 251 is electromagnetically connected to a left side of the reference conductor 20. The first conductor section 251 extends in the +Y direction. The other end of the first conductor section 251 is bent parallel to the X direction to form the second conductor section 252. The second conductor section 252 extends in the +X direction. A tip of the second conductor section 252 is bent parallel to the Y direction to form the third conductor section 253. The third conductor section 253 extends in the −Y direction. A tip of the third conductor section 253 is not electromagnetically connected to the reference conductor 20. The second resonator 25 serves as a λ/4 resonator.

The second resonator 22, the second resonator 23, the second resonator 24, and the second resonator 25 have the same shape. Each of shapes of the second resonator 22, the second resonator 23, the second resonator 24, and the second resonator 25 is also referred to as a hairpin shape. Each of shapes of the second resonator 22, the second resonator 23, the second resonator 24, and the second resonator 25 is not limited to the shape illustrated in FIG. 3. The second resonator 22, the second resonator 23, the second resonator 24, and the second resonator 25 need only be formed in rotationally symmetric shapes with respect to each other on the XY plane.

That is, in the first resonant structure 11, two different types of resonators, a λ/2 resonator and λ/4 resonators, are formed on the same plane.

Figure 4:
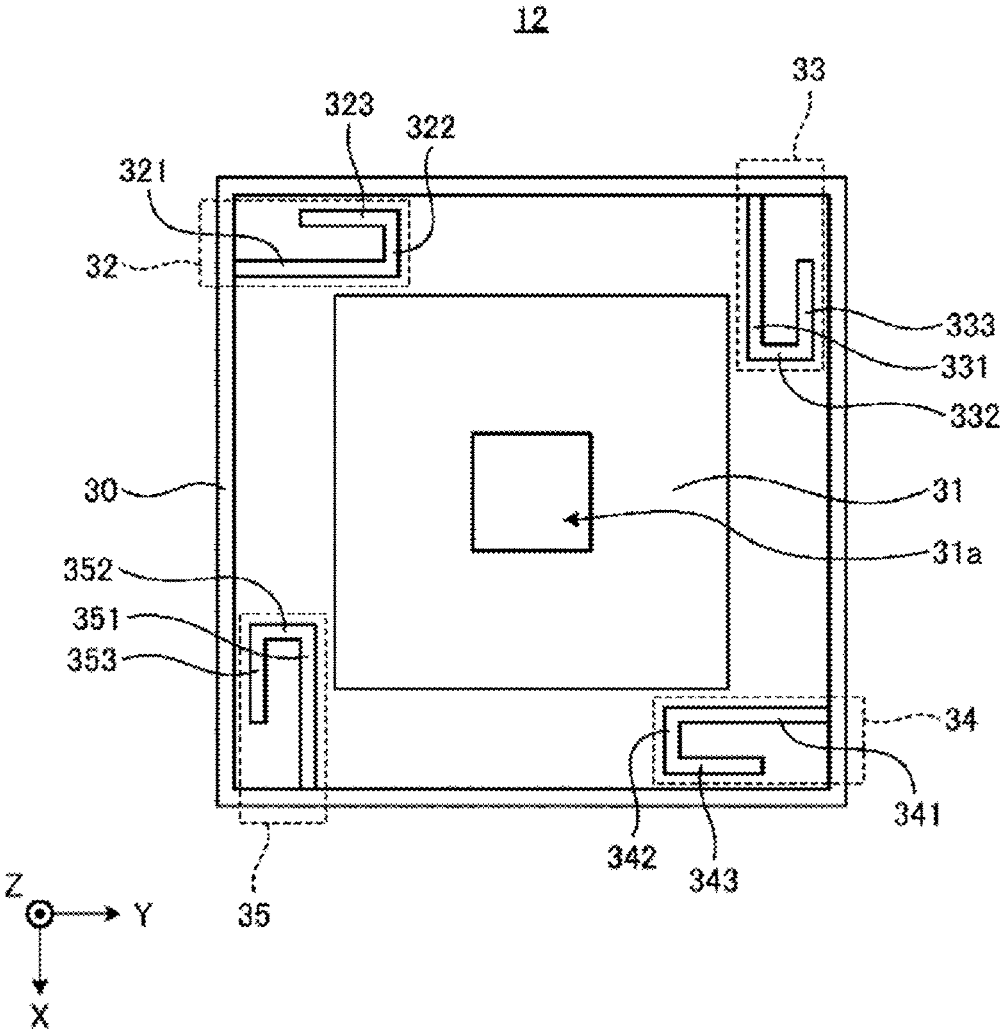
FIG. 4 is a diagram illustrating a configuration example of a second resonant structure according to the first embodiment.

A configuration example of the second resonant structure according to the first embodiment will be described with reference to FIG. 4. FIG. 4 is a diagram illustrating the configuration example of the second resonant structure according to the first embodiment.

In the second resonant structure 12, the reference conductor 30, the first resonator 31, the second resonator 32, the second resonator 33, the second resonator 34, and the second resonator 35 are formed on the same XY plane.

The reference conductor 30 is formed in a rectangular shape extending on the XY plane. The shape of the reference conductor 30 is not limited. The reference conductor 30 is formed so as to surround the first resonator 31, the second resonator 32, the second resonator 33, the second resonator 34, and the second resonator 35. The reference conductor 30 is electromagnetically connected to a reference potential. The reference potential is ground, but not limited thereto.

The first resonator 31 is made of a conductor. The first resonator 31 is formed, for example, in a center portion of the inner circumference of the reference conductor 30. The first resonator 31 is formed on the XY plane. The first resonator 31 is not electromagnetically connected to the reference conductor 30. That is, the first resonator 31 serves as a λ/2 resonator. The first resonator 31 is, for example, a rectangular patch conductor extending on the XY plane, but is not limited thereto. The first resonator 31 has a hole 31*a* in a center portion thereof. The first resonator 31 may not have the hole 31*a*. By adjusting a size of the hole 31*a* of the first resonator 31, a capacitance value of the second resonant structure 12 can be adjusted.

The second resonator 32 is made of a conductor. The second resonator 32 is formed, for example, in an upper left corner portion of the inner circumference of the reference conductor 30. The second resonator 32 is formed on the XY plane. The second resonator 32 includes a first conductor section 321, a second conductor section 322, and a third conductor section 323. One end of the first conductor section 321 is electromagnetically connected to a left side of the reference conductor 30. The first conductor section 321 extends in the +Y direction. The other end of the first conductor section 321 is bent parallel to the X direction to form the second conductor section 322. The second conductor section 322 extends in the −X direction. A tip of the second conductor section 322 is bent parallel to the Y direction to form the third conductor section 323. The third conductor section 323 extends in the −Y direction. A tip of the third conductor section 323 is not electromagnetically connected to the reference conductor 30. The second resonator 32 serves as a λ/4 resonator.

The second resonator 33 is made of a conductor. The second resonator 33 is formed, for example, in an upper right corner portion of the inner circumference of the reference conductor 30. The second resonator 33 is formed on the XY plane. The second resonator 33 includes a first conductor section 331, a second conductor section 332, and a third conductor section 333. One end of the first conductor section 331 is electromagnetically connected to an upper side of the reference conductor 30. The first conductor section 331 extends in the +X direction. The other end of the first conductor section 331 is bent parallel to the Y direction to form the second conductor section 332. The second conductor section 332 extends in the +Y direction. A tip of the second conductor section 332 is bent parallel to the X direction to form the third conductor section 333. The third conductor section 333 extends in the −X direction. A tip of the third conductor section 333 is not electromagnetically connected to the reference conductor 30. The second resonator 33 serves as a λ/4 resonator.

The second resonator 34 is made of a conductor. The second resonator 34 is formed, for example, in a lower right corner portion of the inner circumference of the reference conductor 30. The second resonator 34 is formed on the XY plane. The second resonator 34 includes a first conductor section 341, a second conductor section 342, and a third conductor section 343. One end of the first conductor section 341 is electromagnetically connected to a right side of the reference conductor 30. The first conductor section 341 extends in the −Y direction. The other end of the first conductor section 341 is bent parallel to the X direction to form the second conductor section 342. The second conductor section 342 extends in the +X direction. A tip of the second conductor section 342 is bent parallel to the Y direction to form the third conductor section 343. The third conductor section 343 extends in the +Y direction. A tip of the third conductor section 343 is not electromagnetically connected to the reference conductor 30. The second resonator 34 serves as a λ/4 resonator.

The second resonator 35 is made of a conductor. The second resonator 35 is formed, for example, in a lower left corner portion of the inner circumference of the reference conductor 30. The second resonator 35 is formed on the XY plane. The second resonator 35 includes a first conductor section 351, a second conductor section 352, and a third conductor section 353. One end of the first conductor section 351 is electromagnetically connected to a lower side of the reference conductor 30. The first conductor section 351 extends in the −X direction. The other end of the first conductor section 351 is bent parallel to the Y direction to form the second conductor section 352. The second conductor section 352 extends in the −Y direction. A tip of the second conductor section 352 is bent parallel to the X direction to form the third conductor section 353. The third conductor section 353 extends in the +Y direction. A tip of the third conductor section 353 is not electromagnetically connected to the reference conductor 30. The second resonator 35 serves as a λ/4 resonator.

The second resonator 32, the second resonator 33, the second resonator 34, and the second resonator 35 have the same shape. Each of shapes of the second resonator 32, the second resonator 33, the second resonator 34, and the second resonator 35 is also referred to as a hairpin shape. Each of shapes of the second resonator 32, the second resonator 33, the second resonator 34, and the second resonator 35 is not limited to the shape illustrated in FIG. 4. The second resonator 32, the second resonator 33, the second resonator 34, and the second resonator 35 need only be formed in rotationally symmetric shapes with respect to each other on the XY plane.

That is, in the second resonant structure 12, two different types of resonators, a λ/2 resonator and λ/4 resonators, are formed on the same plane.

As illustrated in FIGS. 3 and 4, the second resonator 22 and the second resonator 32 facing the second resonator 22 have the same shape. The second resonator 22 and the second resonator 32 are formed so as not to overlap each other on the XY plane. For example, the second resonator 32 is formed in the second resonant structure 12 by inverting and rotating the second resonator 22 formed in the first resonant structure 11. Specifically, the second resonator 32 is formed in the second resonant structure 12 by inverting the second resonator 22 and rotating the second resonator 22 by 90°.

As illustrated in FIGS. 3 and 4, the second resonator 23 and the second resonator 33 facing the second resonator 23 have the same shape. The second resonator 23 and the second resonator 33 are formed so as not to overlap each other on the XY plane. For example, the second resonator 33 is formed in the second resonant structure 12 by inverting and rotating the second resonator 23 formed in the first resonant structure 11. Specifically, the second resonator 33 is formed in the second resonant structure 12 by inverting the second resonator 23 and rotating the second resonator 23 by 90°.

As illustrated in FIGS. 3 and 4, the second resonator 24 and the second resonator 34 facing the second resonator 24 have the same shape. The second resonator 24 and the second resonator 34 are formed so as not to overlap each other on the XY plane. For example, the second resonator 34 is formed in the second resonant structure 12 by inverting and rotating the second resonator 24 formed in the first resonant structure 11. Specifically, the second resonator 34 is formed in the second resonant structure 12 by inverting the second resonator 24 and rotating the second resonator 24 by 90°.

As illustrated in FIGS. 3 and 4, the second resonator 25 and the second resonator 35 facing the second resonator 25 have the same shape. The second resonator 25 and the second resonator 35 are formed so as not to overlap each other on the XY plane. For example, the second resonator 35 is formed in the second resonant structure 12 by inverting and rotating the second resonator 25 formed in the first resonant structure 11. Specifically, the second resonator 35 is formed in the second resonant structure 12 by inverting the second resonator 25 and rotating the second resonator 25 by 90°.

As described above, in the present embodiment, the unit structure 10 has a two-layer structure including the first resonant structure 11 and the second resonant structure 12. In the present embodiment, by using the unit structure 10, a thin radio wave control plate that has a large amount of change in phase and is compatible with both polarized waves can be provided.

Second Embodiment

Comparison of Characteristics

In the present embodiment, by adjusting the sizes and overlaps of the second resonators 22 to 25 and the second resonators 32 to 35, respectively, an amount of change in phase of radio waves and a frequency band through which radio waves are transmitted can be adjusted.

First Example

Figure 5:
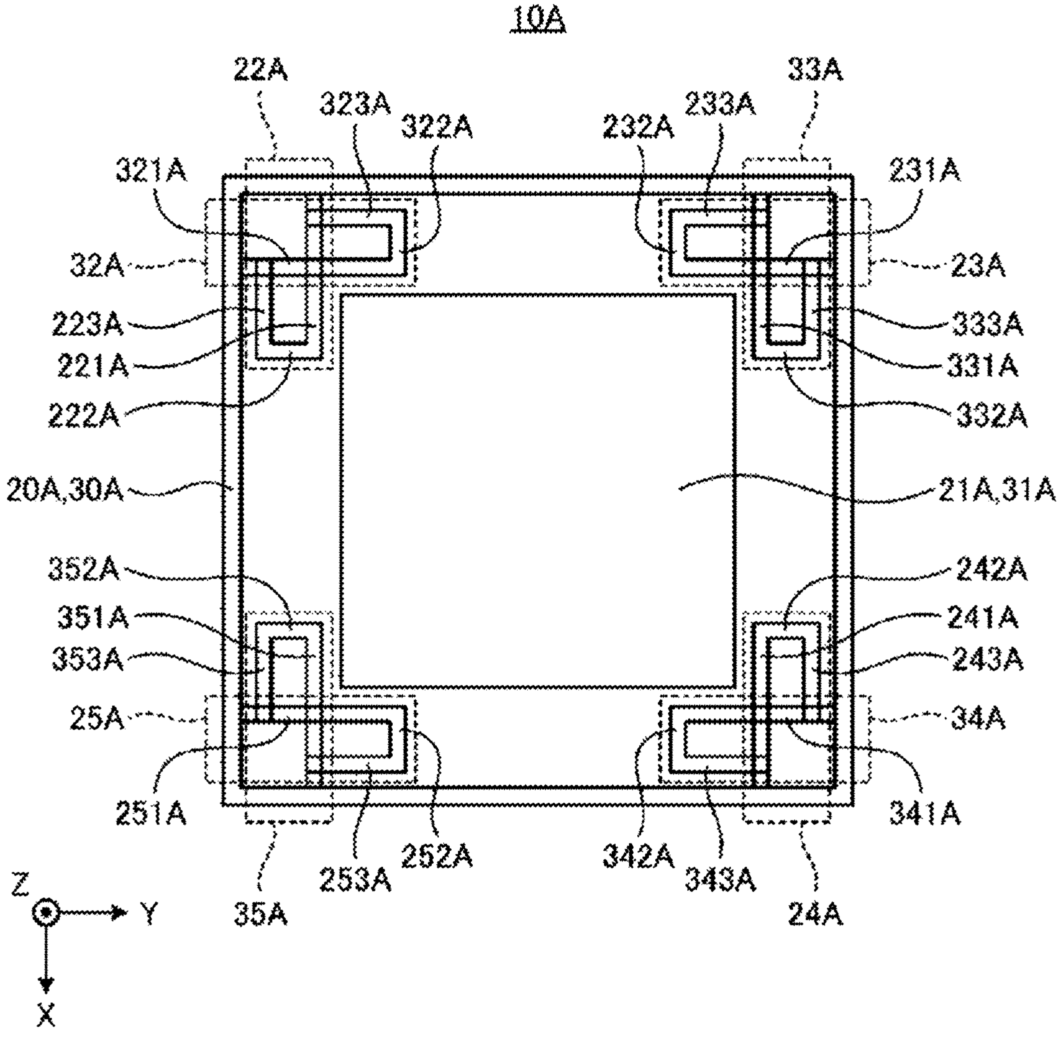
FIG. 5 is a diagram illustrating a positional relationship between second resonators of a first resonant structure and second resonators of a second resonant structure according to a first example of a second embodiment.

A positional relationship between second resonators of a first resonant structure and second resonators of a second resonant structure in a unit structure according to a first example of a second embodiment will be described with reference to FIG. 5. FIG. 5 is a diagram illustrating the positional relationship between the second resonators of the first resonant structure and the second resonators of the second resonant structure according to the first example of the second embodiment.

FIG. 5 illustrates a positional relationship of a reference conductor 20A, a first resonator 21A, a second resonator 22A, a second resonator 23A, a second resonator 24A, a second resonator 25A, a reference conductor 30A, a first resonator 31A, a second resonator 32A, a second resonator 33A, a second resonator 34A, and a second resonator 35A on an XY plane when a unit structure 10A is viewed from above.

The reference conductor 20A and the reference conductor 30A are formed so as to overlap each other on the XY plane. The first resonator 21A and the first resonator 31A are formed so as to overlap each other on the XY plane.

The second resonator 22A includes a first conductor section 221A, a second conductor section 222A, and a third conductor section 223A. The second resonator 23A includes a first conductor section 321A, a second conductor section 322A, and a third conductor section 323A. The second resonator 22A and the second resonator 23A are formed so as to face each other. The second resonator 22A is formed such that a tip portion of the third conductor section 223A overlaps the first conductor section 321A. The second resonator 32A is formed such that a tip portion of the third conductor section 323A overlaps the first conductor section 221A.

The second resonator 23A includes a first conductor section 231A, a second conductor section 232A, and a third conductor section 233A. The second resonator 33A includes a first conductor section 331A, a second conductor section 332A, and a third conductor section 333A. The second resonator 23A and the second resonator 33A are formed so as to face each other. The second resonator 23A is formed such that a tip portion of the third conductor section 233A overlaps the first conductor section 331A. The second resonator 33A is formed such that a tip portion of the third conductor section 333A overlaps the first conductor section 231A.

The second resonator 24A includes a first conductor section 241A, a second conductor section 242A, and a third conductor section 243A. The second resonator 34A includes a first conductor section 341A, a second conductor section 342A, and a third conductor section 343A. The second resonator 24A and the second resonator 34A are formed so as to face each other. The second resonator 24A is formed such that a tip portion of the third conductor section 243A overlaps the first conductor section 341A. The second resonator 34A is formed such that a tip portion of the third conductor section 343A overlaps the first conductor section 241A.

The second resonator 25A includes a first conductor section 251A, a second conductor section 252A, and a third conductor section 253A. The second resonator 35A includes a first conductor section 351A, a second conductor section 352A, and a third conductor section 353A. The second resonator 25A and the second resonator 35A are formed so as to face each other. The second resonator 25A is formed such that a tip portion of the third conductor section 253A overlaps the first conductor section 351A. The second resonator 35A is formed such that a tip portion of the third conductor section 353A overlaps the first conductor section 251A.

In the present embodiment, an amount of change in phase can be controlled by adjusting positions of attenuation poles appearing in a transmission characteristic of the unit structure 10A.

A radio wave refracting plate 1 according to the present embodiment has two or more resonant frequencies. The radio wave refracting plate 1 is configured to form a pass band of a bandpass filter using some of two or more resonant frequencies. Specifically, the radio wave refracting plate 1 has four resonant frequencies, including a first resonant frequency, a second resonant frequency, a third resonant frequency, and a fourth resonant frequency in this order from a low frequency side. Two resonant frequencies on a high frequency side are used for forming the pass band of the bandpass filter.

Figure 6:
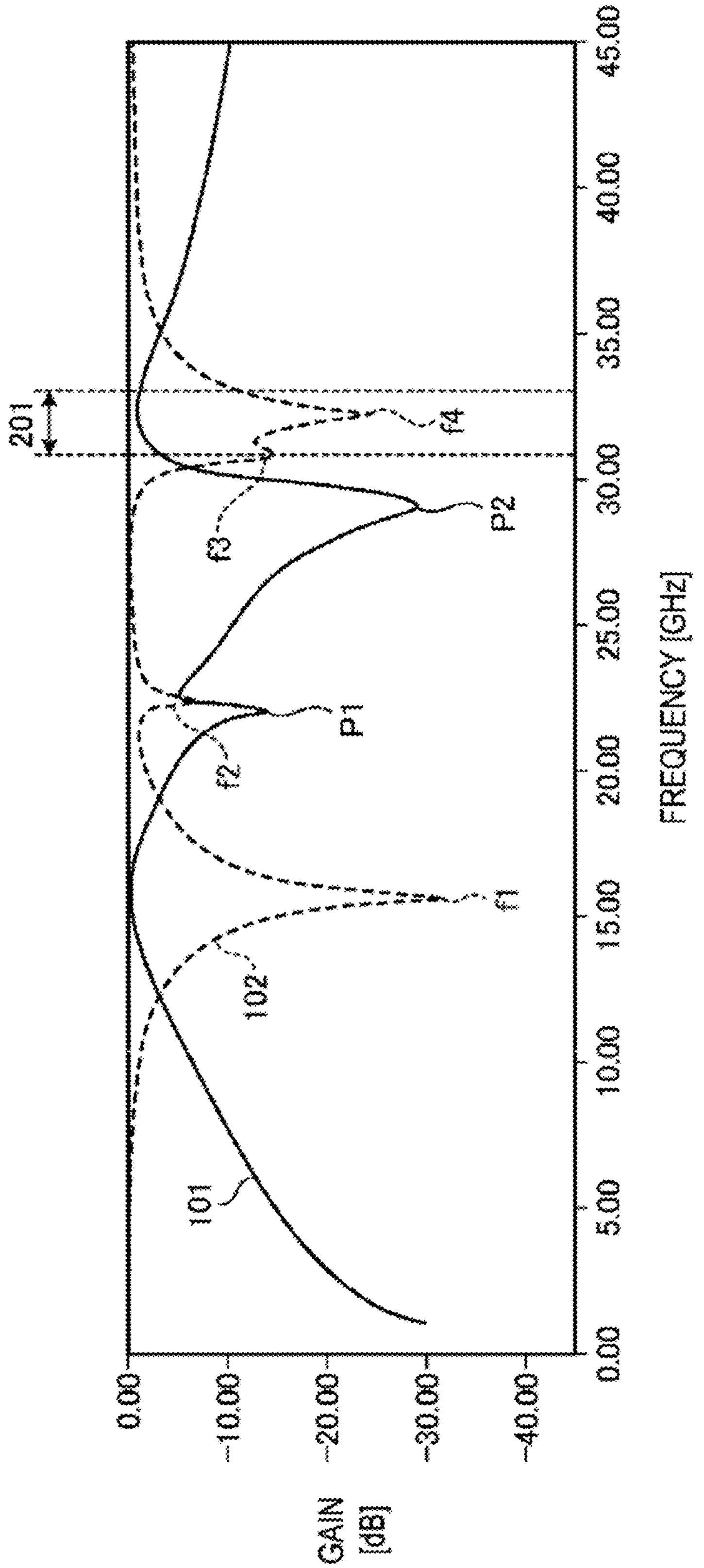
FIG. 6 is a diagram showing a reflection characteristic and a transmission characteristic of a unit structure according to the first example of the second embodiment.
Figure 7:
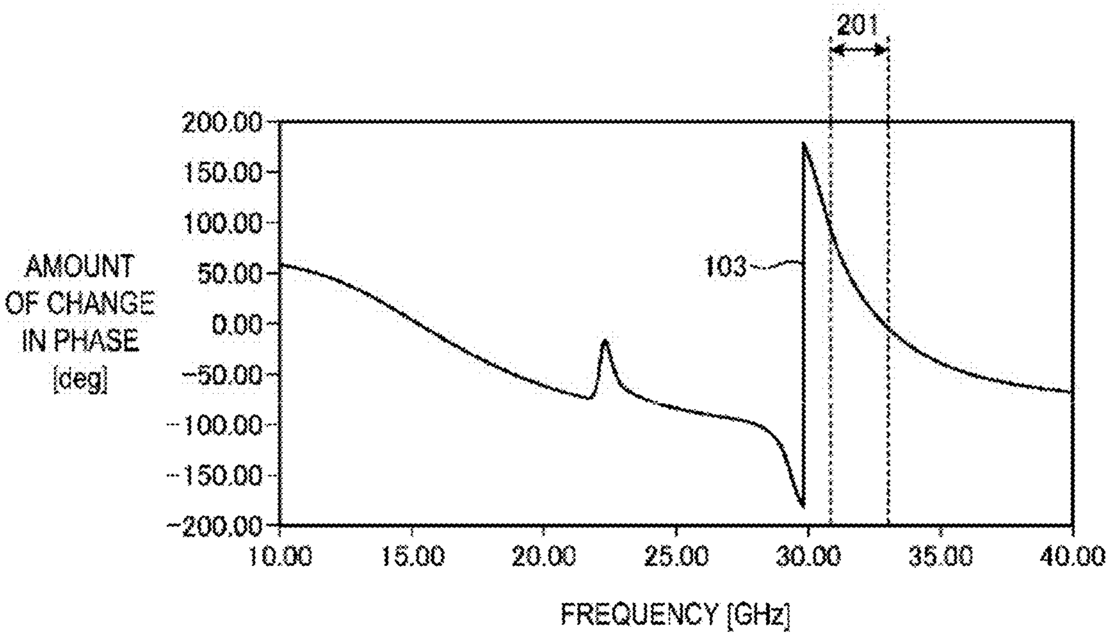
FIG. 7 is a diagram showing an amount of change in phase of the unit structure according to the first example of the second embodiment.

Characteristics of the unit structure according to the first example of the second embodiment will be described with reference to FIGS. 6 and 7. FIG. 6 is a diagram showing a reflection characteristic and a transmission characteristic of the unit structure according to the first example of the second embodiment. FIG. 7 is a diagram showing an amount of change in phase of the unit structure according to the first example of the second embodiment.

In FIG. 6, a horizontal axis represents a frequency [gigahertz (GHz)] and a vertical axis represents a gain [decibel (dB)]. A graph 101 shows a transmission characteristic of the unit structure 10A. A graph 102 shows a reflection characteristic of the unit structure 10A.

As indicated by the graph 101, the unit structure 10A has two attenuation poles, namely, an attenuation pole P1 and an attenuation pole P2, in the transmission characteristic. In the present embodiment, by adjusting positions at which the attenuation pole P1 and the attenuation pole P2 are generated, a pass band of the unit structure 10A as a bandpass filter can be adjusted.

As indicated by the graph 102, the unit structure 10A has four resonant frequencies, including a first resonant frequency f1, a second resonant frequency f2, a third resonant frequency f3, and a fourth resonant frequency f4.

The attenuation pole P1 and the attenuation pole P2 are formed in a frequency band between the first resonant frequency f1 and the fourth resonant frequency f4. The attenuation pole P1 and the attenuation pole P2 are formed in a frequency band between the first resonant frequency f1 and the third resonant frequency f3. In the present embodiment, the frequencies of the attenuation pole P1 and the attenuation pole P2 are overlapped so that the attenuation pole P1 and the attenuation pole P2 appear to be one attenuation pole. Thus, a region 201 in which the reflection characteristic is-10 dB or less can be formed. The region 201 serves as a pass band of the bandpass filter. The region 201 is, for example, a band from about 31.00 GHz to 33.00 GHz, but is not limited thereto. The region 201 may include two resonant frequencies on a high frequency side: the third resonant frequency f3 and fourth resonant frequency f4. That is, in the first example of the second embodiment, it can be said that the pass band is formed using two resonant frequencies, the third resonant frequency f3 and fourth resonant frequency f4.

As shown in FIG. 7, the unit structure 10A can change a phase in the region 201 from 100° to 0°. By using the unit structure 10A, the radio wave control plate can be made thinner.

Second Example

Figure 8:
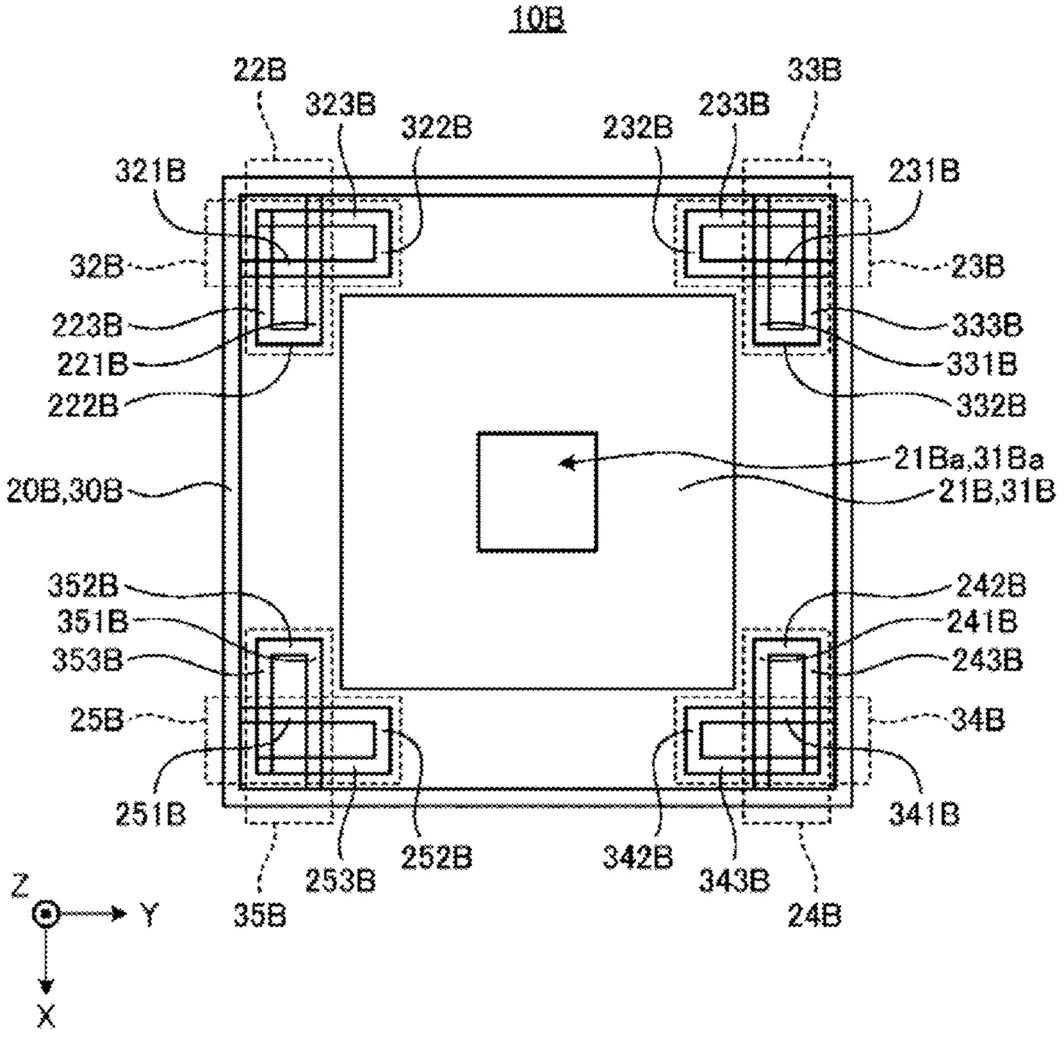
FIG. 8 is a diagram illustrating a positional relationship between second resonators of a first resonant structure and second resonators of a second resonant structure according to a second example of the second embodiment.

A positional relationship between second resonators of a first resonant structure and second resonators of a second resonant structure in a unit structure according to a second example of the second embodiment will be described with reference to FIG. 8. FIG. 8 is a diagram illustrating the positional relationship between the second resonators of the first resonant structure and the second resonators of the second resonant structure according to the second example of the second embodiment.

FIG. 8 illustrates a positional relationship of a reference conductor 20B, a first resonator 21B, a second resonator 22B, a second resonator 23B, a second resonator 24B, a second resonator 25B, a reference conductor 30B, a first resonator 31B, a second resonator 32B, a second resonator 33B, a second resonator 34B, and a second resonator 35B on the XY plane when a unit structure 10B is viewed from above.

The first resonator 21B is different from the first resonator 21A illustrated in FIG. 5 in that the first resonator 21B has a hole 21Ba. The first resonator 31B is different from the first resonator 31A illustrated in FIG. 5 in that the first resonator 31B has a hole 31Ba.

The second resonator 22B includes a first conductor section 221B, a second conductor section 222B, and a third conductor section 223B. The second resonator 32B includes a first conductor section 321B, a second conductor section 322B, and a third conductor section 323B. The second resonator 22B is different from the second resonator 22A illustrated in FIG. 5 in that a tip portion of the third conductor section 223B is formed so as to overlap a tip portion of the third conductor section 323B of the second resonator 32B.

The second resonator 23B includes a first conductor section 231B, a second conductor section 232B, and a third conductor section 233B. The second resonator 33B includes a first conductor section 331B, a second conductor section 332B, and a third conductor section 333B. The second resonator 23B is different from the second resonator 23A illustrated in FIG. 5 in that a tip portion of the third conductor section 233B is formed so as to overlap a tip portion of the third conductor section 333B of the second resonator 33B.

The second resonator 24B includes a first conductor section 241B, a second conductor section 242B, and a third conductor section 243B. The second resonator 34B includes a first conductor section 341B, a second conductor section 342B, and a third conductor section 343B. The second resonator 24B is different from the second resonator 24A illustrated in FIG. 5 in that a tip portion of the third conductor section 243B is formed so as to overlap a tip portion of the third conductor section 343B of the second resonator 34B.

The second resonator 25B includes a first conductor section 251B, a second conductor section 252B, and a third conductor section 253B. The second resonator 35B includes a first conductor section 351B, a second conductor section 352B, and a third conductor section 353B. The second resonator 25B is different from the second resonator 25A illustrated in FIG. 5 in that a tip portion of the third conductor section 253B is formed so as to overlap a tip portion of the third conductor section 353B of the second resonator 35B.

Figure 9:
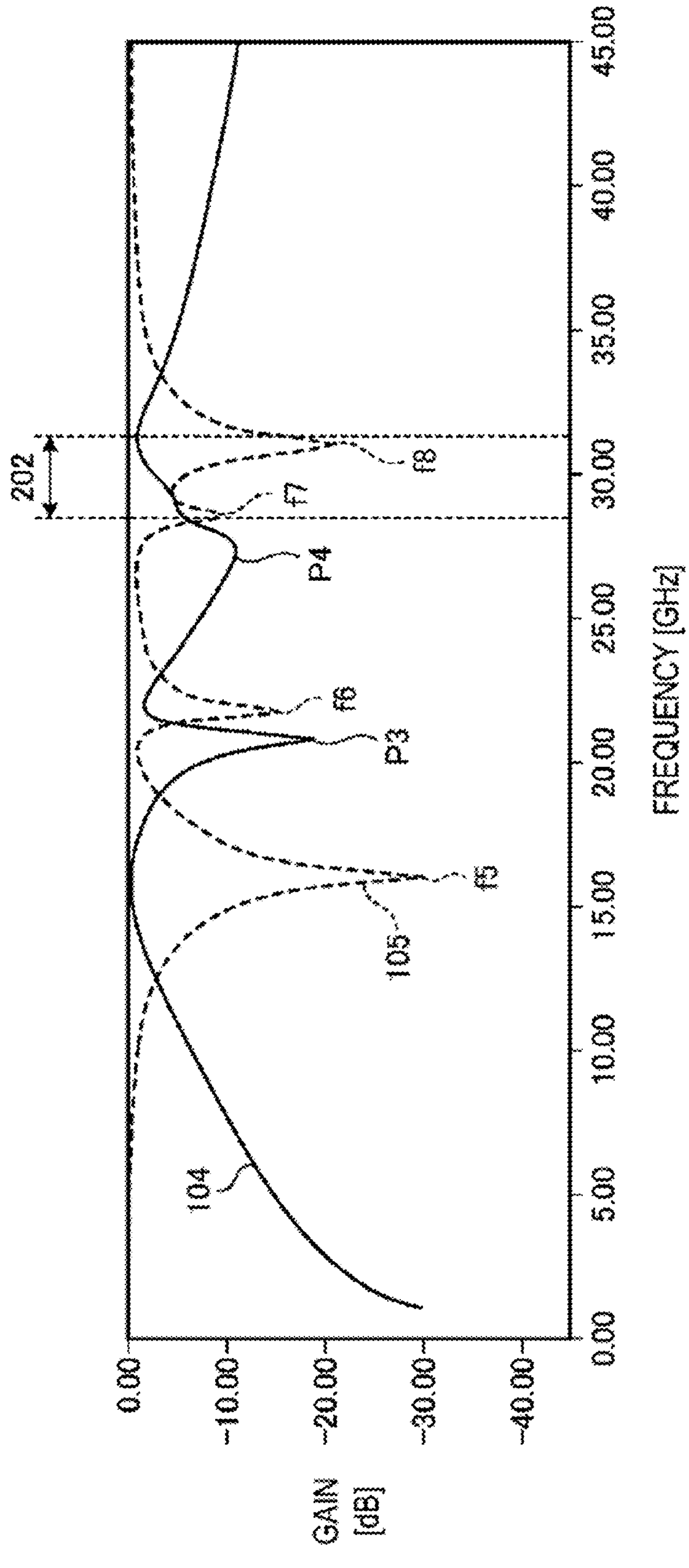
FIG. 9 is a diagram showing a reflection characteristic and a transmission characteristic of a unit structure according to the second example of the second embodiment.
Figure 10:
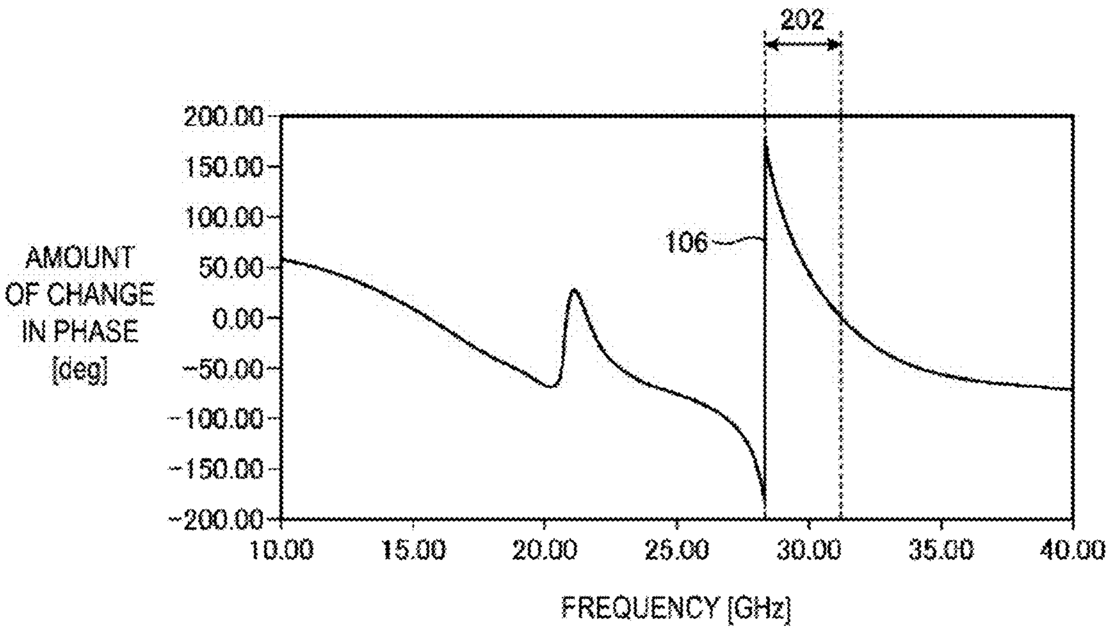
FIG. 10 is a diagram showing an amount of change in phase of the unit structure according to the second example of the second embodiment.

Characteristics of the unit structure according to the second example of the second embodiment will be described with reference to FIGS. 9 and 10. FIG. 9 is a diagram showing a reflection characteristic and a transmission characteristic of the unit structure according to the second example of the second embodiment. FIG. 10 is a diagram showing an amount of change in phase of the unit structure according to the second example of the second embodiment.

In FIG. 9, the horizontal axis represents the frequency [GHz] and the vertical axis represents the gain [dB]. A graph 104 shows a transmission characteristic of the unit structure 10B. A graph 105 shows a reflection characteristic of the unit structure 10B.

As indicated by the graph 104, the unit structure 10B has two attenuation poles, namely, an attenuation pole P3 and an attenuation pole P4, in the transmission characteristic.

As indicated by the graph 105, the unit structure 10B has four resonant frequencies, including a first resonant frequency f5, a second resonant frequency f6, a third resonant frequency f7, and a fourth resonant frequency f8.

The attenuation pole P3 and the attenuation pole P4 are formed in a frequency band between the first resonant frequency f5 and the fourth resonant frequency f8. The attenuation pole P3 is formed in a frequency band between the first resonant frequency f5 and the second resonant frequency f6. The attenuation pole P4 is formed in a frequency band between the second resonant frequency f6 and the third resonant frequency f7. In the present embodiment, the frequencies of the attenuation pole P3 and the attenuation pole P4 are overlapped so that the attenuation pole P3 and the attenuation pole P4 appear to be one attenuation pole. Thus, a region 202 in which the reflection characteristic is-5 dB or less can be formed. The region 202 serves as a pass band of a bandpass filter. The region 202 is, for example, a band from about 28.50 GHz to 31.00 GHz, but is not limited thereto.

As shown in FIG. 10, the unit structure 10B can change a phase of radio waves in a range from 180° to 0° in the region 202. By using the unit structure 10B, a configuration of the radio wave control plate can be made thinner.

Third Embodiment

A third embodiment will be described. In the third embodiment, by using the unit structure 10A illustrated in FIG. 5 or the unit structure 10B illustrated in FIG. 8, a radio wave control plate capable of changing a phase of radio waves over a wide range can be formed.

Figure 11:
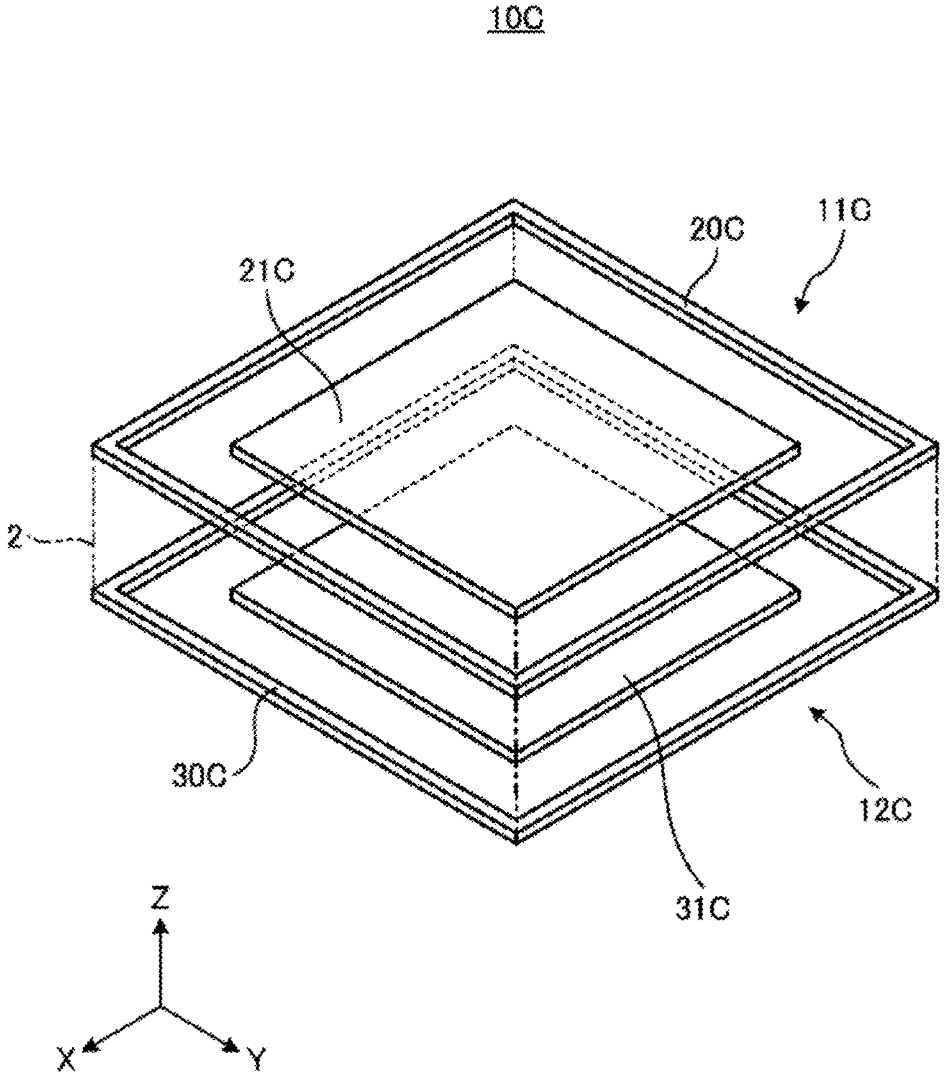
FIG. 11 is a diagram illustrating a configuration example of a unit structure according to a comparative example.

Before describing the third embodiment, a configuration example of a unit structure according to a comparative example will be described with reference to FIG. 11. FIG. 11 is a diagram illustrating the configuration example of the unit structure according to the comparative example.

A unit structure 10C includes a substrate 2, a first resonant structure 11C, and a second resonant structure 12C. The unit structure 10C has a two-layer structure in which two resonant structures are layered in two layers. The first resonant structure 11C and the second resonant structure 12C are placed to face each other with a space therebetween in a Z direction.

The first resonant structure 11C may be formed in a rectangular shape. The shape of the first resonant structure 11C is not limited to the rectangular shape. The first resonant structure 11C includes a reference conductor 20C and a first resonator 21C. The reference conductor 20C is formed so as to surround the first resonator 21C. The first resonator 21C serves as a λ/2 resonator.

The second resonant structure 12C may be formed in a rectangular shape. The shape of the second resonant structure 12C is not limited to the rectangular shape. The second resonant structure 12C includes a reference conductor 30C and a first resonator 31C. The reference conductor 30C is formed so as to surround the first resonator 31C. The first resonator 31C serves as a λ/2 resonator.

The reference conductor 20C and the reference conductor 30C face each other. The first resonator 21C and the first resonator 31C face each other.

The unit structure 10C can change a phase of radio waves in a range of, for example, 15° to −130°. That is, the unit structure 10C is different from the unit structure 10A illustrated in FIG. 5 or the unit structure 10B illustrated in FIG. 8 in the range of the phase to be changed. Therefore, by combining the unit structure 10C with a unit structure such as the unit structure 10A and the unit structure 10B, in which a λ/2 resonator and a λ/4 resonator are formed on the same plane, a radio wave control plate capable of changing a phase of radio waves over a wide range can be formed. As an example of this, in a range from 15 GHz to 22 GHz corresponding to f1 to f2 in FIG. 6, a phase changes from 0° to −100° in the phase characteristic in FIG. 7. Thus, by using only the λ/2 resonator and appropriately designing f1 and f2, a pass band with a negative phase can be achieved.

Figure 12:
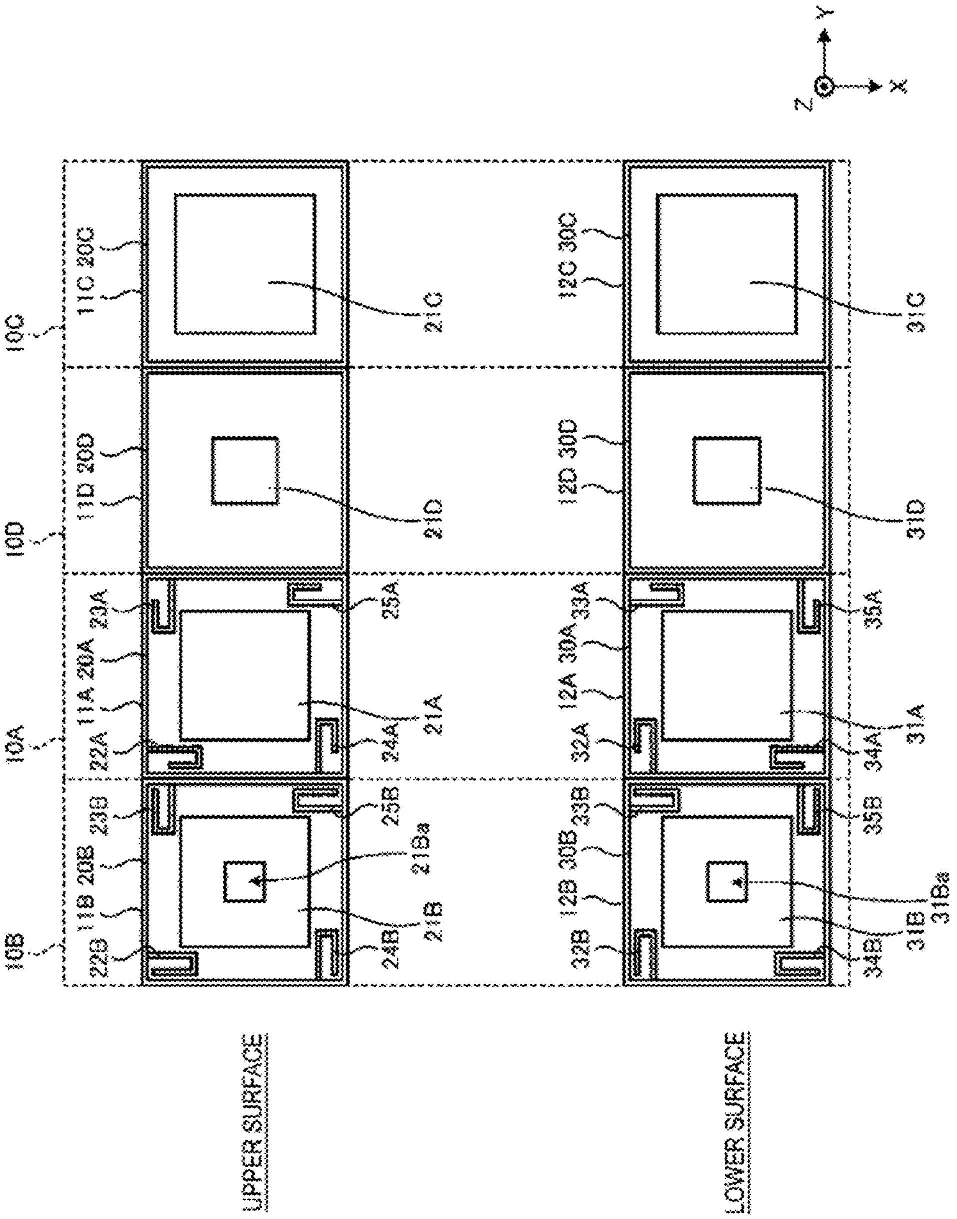
FIG. 12 is a diagram illustrating an arrangement example of unit structures in a radio wave control plate according to a third embodiment.

An arrangement example of unit structures in a radio wave control plate according to the third embodiment will be described with reference to FIG. 12. FIG. 12 is a diagram illustrating the arrangement example of the unit structures in the radio wave control plate according to the third embodiment.

As illustrated in FIG. 12, the radio wave control plate according to the third embodiment includes the unit structure 10A, the unit structure 10B, the unit structure 10C, and a unit structure 10D. In the radio wave control plate according to the third embodiment, the unit structure 10A, the unit structure 10B, the unit structure 10C, and the unit structure 10D are arranged two-dimensionally on an XY plane.

In the unit structure 10D, a size of a first resonator 21D of a first resonant structure 11D is different from a size of the first resonator 21C illustrated in FIG. 11. In the unit structure 10D, a size of a first resonator 31D of a second resonant structure 12D is different from a size of the first resonator 31C illustrated in FIG. 11.

That is, the radio wave control plate according to the third embodiment includes two types of unit structures: the unit structure 10A and the unit structure 10B, each of which includes two types of resonators, a λ/2 resonator and λ/4 resonators, formed on the same plane, and the unit structure 10C and the unit structure 10D, each of which includes only a λ/2 resonator formed on the same plane. A range of a phase angle to be shifted is different between the unit structures 10A and 10B and the unit structures 10C and 10D. In the third embodiment, by arranging four types of unit structures, the unit structure 10A to the unit structure 10D, in the radio wave control plate, the radio wave control plate can cover a range from 0° to 360°. For example, by arranging four unit structures with different amounts of change in phase at 90° intervals, such as 0°, 90°, 180°, and 270°, the radio wave control plate can cover a range from 0° to 360°. In other words, unit cells having a phase characteristic achieved by f1 and f2 and unit cells having a phase characteristic achieved by f3 and f4 are combined to form the radio wave control plate that can cover a range from 0° to 360°.

Fourth Embodiment

A fourth embodiment will be described. In the first embodiment and the second embodiment, the unit structure including the resonant structures, each of which includes two types of resonators, a λ/2 resonator and λ/4 resonators, formed on the same plane, is described. In the present disclosure, two types of λ/2 resonators may be formed in each of resonant structures included in a unit structure.

Figure 13:
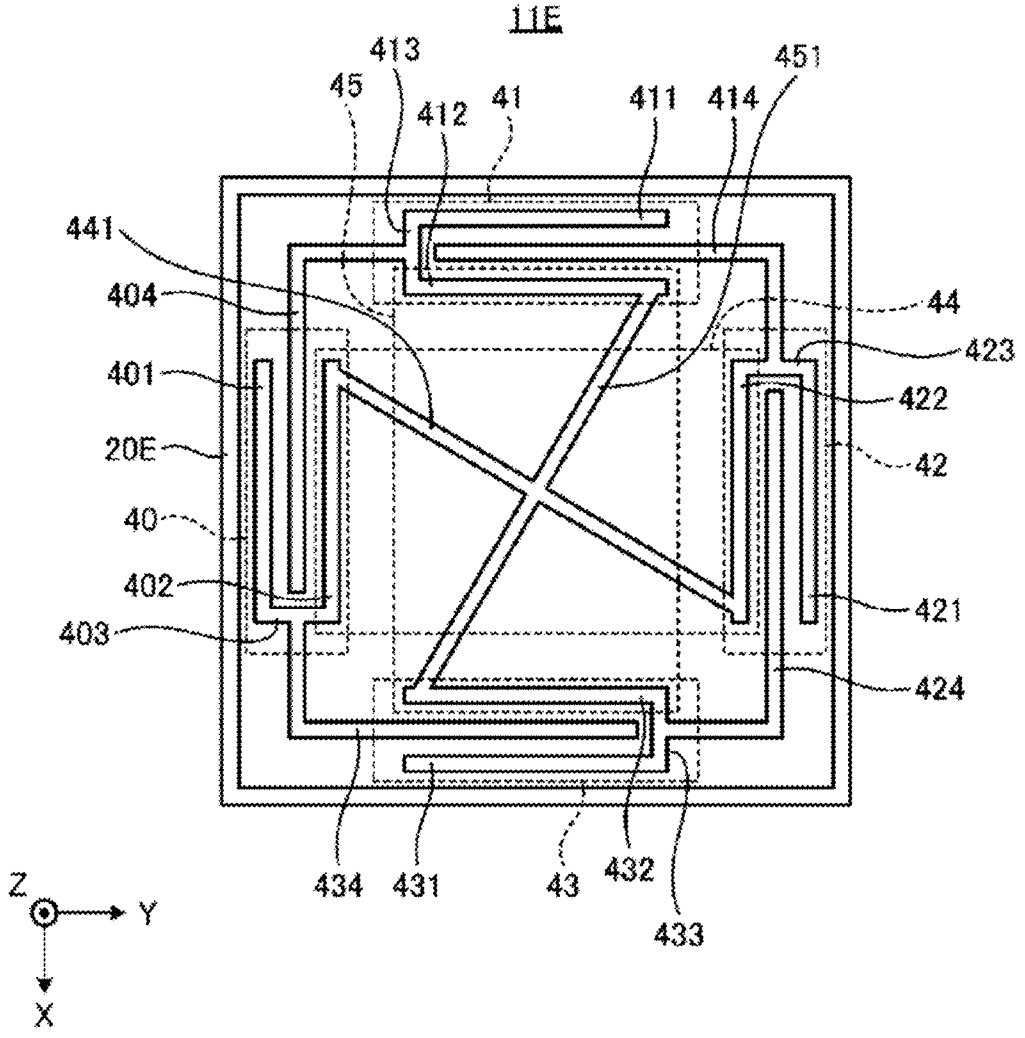
FIG. 13 is a diagram illustrating a resonant structure of a unit structure according to a fourth embodiment.

A resonant structure of a unit structure according to the fourth embodiment will be described with reference to FIG. 13. FIG. 13 is a diagram illustrating the resonant structure of the unit structure according to the fourth embodiment.

A first resonant structure 11E of the unit structure according to the fourth embodiment includes a reference conductor 20E, a resonator 40, a resonator 41, a resonator 42, a resonator 43, a resonator 44, and a resonator 45. A second resonant structure (not illustrated) of the unit structure according to the fourth embodiment has the same configuration as and/or similar configuration to the first resonant structure 11E, and thus description thereof is omitted.

The resonator 40 includes a first conductor section 401, a second conductor section 402, a third conductor section 403, and a fourth conductor section 404.

The first conductor section 401 is formed parallel to an X direction. The second conductor section 402 is formed parallel to the first conductor section 401 and is spaced apart from the first conductor section 401 in a Y direction. The third conductor section 403 is formed parallel to the Y direction so as to electromagnetically connect one end of the first conductor section 401 and one end of the second conductor section 402. The first conductor section 401, the second conductor section 402, and the third conductor section 403 are formed in a U shape on an XY plane. The fourth conductor section 404 is formed parallel to the X direction with one end located between the first conductor section 401 and the second conductor section 402. The fourth conductor section 404 is bent at the other end parallel to the Y direction and is electromagnetically connected to a third conductor section 413. The first conductor section 401, the second conductor section 402, the third conductor section 403, and the fourth conductor section 404 are not electromagnetically connected to the reference conductor 20E. That is, the resonator 40 serves as a λ/2 resonator.

The resonator 41 includes a first conductor section 411, a second conductor section 412, the third conductor section 413, and a fourth conductor section 414.

The first conductor section 411 is formed parallel to the Y direction. The second conductor section 412 is formed parallel to the first conductor section 411 and is spaced apart from the first conductor section 411 in the X direction. The third conductor section 413 is formed parallel to the X direction so as to electromagnetically connect one end of the first conductor section 411 and one end of the second conductor section 412. The first conductor section 411, the second conductor section 412, and the third conductor section 413 are formed in a U shape on the XY plane. The fourth conductor section 414 is formed parallel to the Y direction with one end located between the first conductor section 411 and the second conductor section 412. The fourth conductor section 414 is bent at the other end parallel to the X direction and is electromagnetically connected to a third conductor section 423. The first conductor section 411, the second conductor section 412, the third conductor section 413, and the fourth conductor section 414 are not electromagnetically connected to the reference conductor 20E. That is, the resonator 41 serves as a λ/2 resonator.

The resonator 42 includes a first conductor section 421, a second conductor section 422, the third conductor section 423, and a fourth conductor section 424.

The first conductor section 421 is formed parallel to the X direction. The second conductor section 422 is formed parallel to the first conductor section 421 and is spaced apart from the first conductor section 421 in the Y direction. The third conductor section 423 is formed parallel to the Y direction so as to electromagnetically connect one end of the first conductor section 421 and one end of the second conductor section 422. The first conductor section 421, the second conductor section 422, and the third conductor section 423 are formed in a U shape on the XY plane. The fourth conductor section 424 is formed parallel to the X direction with one end located between the first conductor section 421 and the second conductor section 422. The fourth conductor section 424 is bent at the other end parallel to the Y direction and is electromagnetically connected to a third conductor section 433. The first conductor section 421, the second conductor section 422, the third conductor section 423, and the fourth conductor section 424 are not electromagnetically connected to the reference conductor 20E. That is, the resonator 42 serves as a λ/2 resonator.

The resonator 43 includes a first conductor section 431, a second conductor section 432, the third conductor section 433, and a fourth conductor section 434.

The first conductor section 431 is formed parallel to the Y direction. The second conductor section 432 is formed parallel to the first conductor section 431 and is spaced apart from the first conductor section 431 in the X direction. The third conductor section 433 is formed parallel to the X direction so as to electromagnetically connect one end of the first conductor section 431 and one end of the second conductor section 432. The first conductor section 431, the second conductor section 432, and the third conductor section 433 are formed in a U shape on the XY plane. The fourth conductor section 434 is formed parallel to the Y direction with one end located between the first conductor section 431 and the second conductor section 432. The fourth conductor section 434 is bent at the other end parallel to the X direction and is electromagnetically connected to the third conductor section 403. The first conductor section 431, the second conductor section 432, the third conductor section 433, and the fourth conductor section 434 are not electromagnetically connected to the reference conductor 20E. That is, the resonator 43 serves as a λ/2 resonator.

The resonator 44 includes the second conductor section 402, the second conductor section 422, and a connection conductor section 441.

The connection conductor section 441 electromagnetically connects the other end of the second conductor section 402 and the other end of the second conductor section 422. The connection conductor section 441 is not electromagnetically connected to the reference conductor 20E. That is, the resonator 44 serves as a λ/2 resonator.

The resonator 45 includes the second conductor section 412, the second conductor section 432, and a connection conductor section 451.

The connection conductor section 451 electromagnetically connects the other end of the second conductor section 412 and the other end of the second conductor section 432. The connection conductor section 451 is not electromagnetically connected to the reference conductor 20E. That is, the resonator 45 serves as a λ/2 resonator.

That is, the first resonant structure 11E includes six λ/2 resonators.

Figure 14:
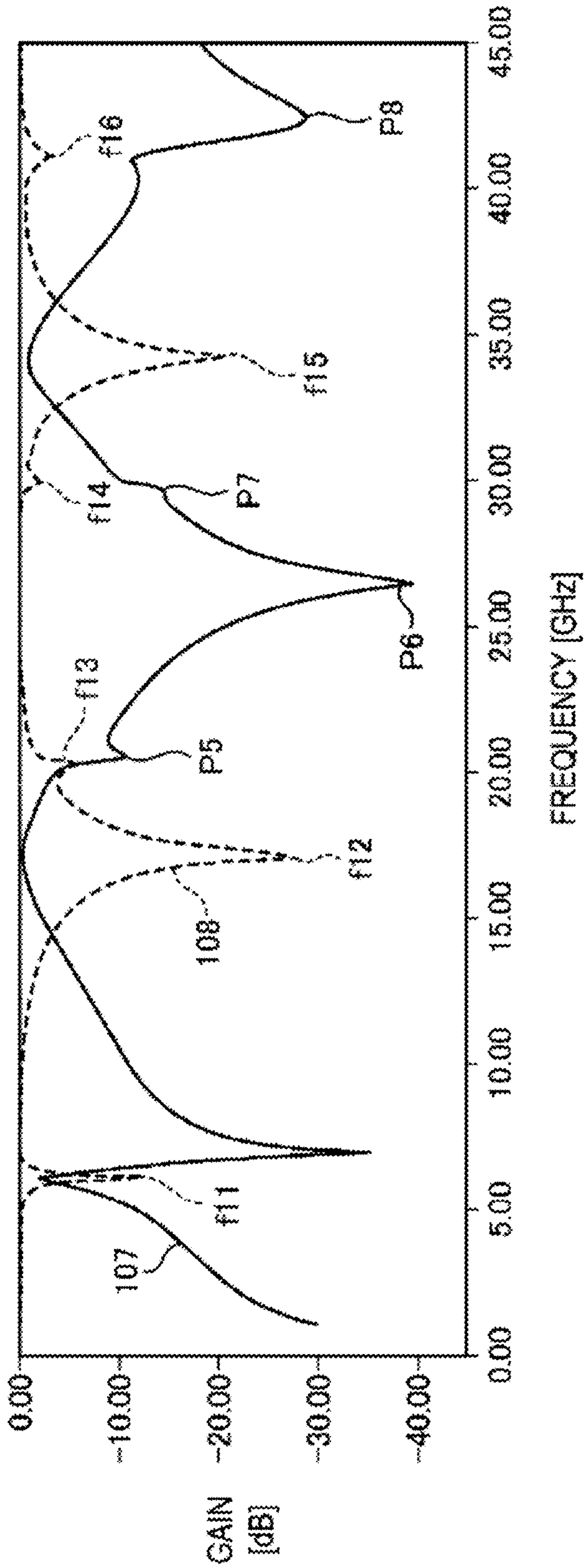
FIG. 14 is a diagram showing a reflection characteristic and a transmission characteristic of the unit structure according to the fourth embodiment.

Characteristics of the unit structure according to the fourth embodiment will be described with reference to FIG. 14. FIG. 14 is a diagram showing a reflection characteristic and a transmission characteristic of the unit structure according to the fourth embodiment.

In FIG. 14, a horizontal axis represents a frequency [GHz] and a vertical axis represents a gain [dB]. A graph 107 shows a transmission characteristic of the unit structure according to the fourth embodiment. A graph 108 shows a reflection characteristic of the unit structure.

As indicated by the graph 108, the unit structure according to the fourth embodiment has six resonant frequencies, namely, a first resonant frequency f11, a second resonant frequency f12, a third resonant frequency f13, a fourth resonant frequency f14, a fifth resonant frequency f15, and a sixth resonant frequency f16.

As indicated by the graph 107, the unit structure according to the fourth embodiment has four attenuation poles, including an attenuation pole P5, an attenuation pole P6, an attenuation pole P7, and an attenuation pole P8 in the transmission characteristic. In the present embodiment, by adjusting positions at which the attenuation poles are generated, a pass band of the unit structure as a bandpass filter can be adjusted.

Fifth Embodiment

A fifth embodiment will be described. A resonant structure according to the fifth embodiment includes a plurality of resonant sections that function as λ/2 resonators in response to a frequency of radio waves received from the outside.

Figure 15:
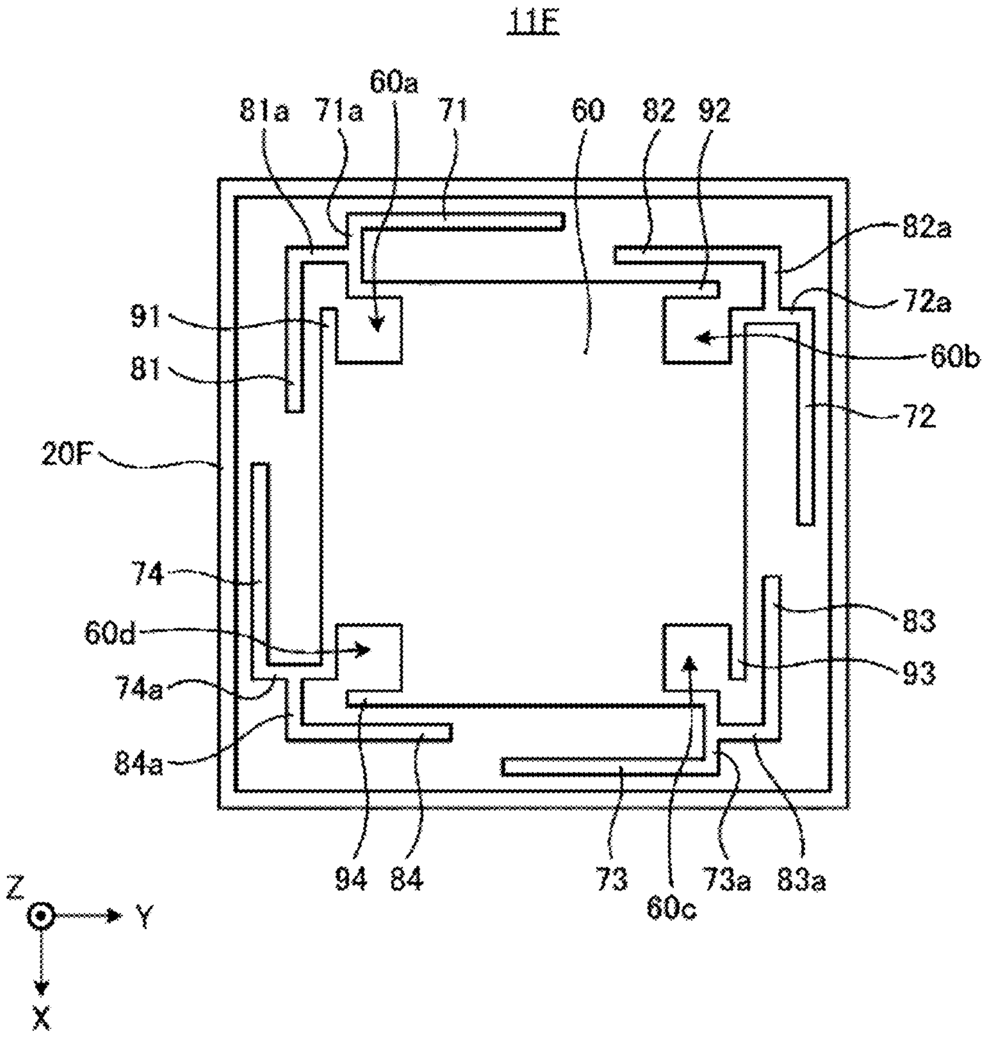
FIG. 15 is a diagram illustrating a resonant structure of a unit structure according to a fifth embodiment.

A resonant structure of a unit structure according to the fifth embodiment will be described with reference to FIG. 15. FIG. 15 is a diagram illustrating the resonant structure of the unit structure according to the fifth embodiment.

A first resonant structure 11F of the unit structure according to the fifth embodiment includes a reference conductor 20F, a patch conductor 60, a first conductor section 71, a first conductor section 72, a first conductor section 73, a first conductor section 74, a second conductor section 81, a second conductor section 82, a second conductor section 83, a second conductor section 84, a third conductor section 91, a third conductor section 92, a third conductor section 93, a third conductor section 94, a cutout section 60*a*, a cutout section 60*b*, a cutout section 60*c*, and a cutout section 60*d*. The patch conductor 60, the first conductor section 71, the first conductor section 72, the first conductor section 73, the first conductor section 74, the second conductor section 81, the second conductor section 82, the second conductor section 83, the second conductor section 84, the third conductor section 91, the third conductor section 92, the third conductor section 93, and the third conductor section 94 are formed in the reference conductor 20F. A second resonant structure (not illustrated) of the unit structure according to the fifth embodiment has the same configuration as and/or similar configuration to the first resonant structure 11F, and thus description thereof is omitted.

The patch conductor 60 is, for example, a conductor formed in a rectangular shape. The cutout section 60*a* is formed in an upper left portion of the patch conductor 60. The cutout section 60*b* is formed in an upper right portion of the patch conductor 60. The cutout section 60*c* is formed in a lower right portion of the patch conductor 60. The cutout section 60*d* is formed in a lower left portion of the patch conductor 60. Sizes and shapes of the cutout section 60*a* to the cutout section 60*d* can be changed as desired depending on design.

The first conductor section 71 is formed in an upper left portion of the patch conductor 60. The first conductor section 71 is formed in an upper portion of the cutout section 60*a*. The first conductor section 71 is a conductor formed parallel to a Y direction. One end of the first conductor section 71 and the patch conductor 60 are electromagnetically connected by a connection conductor section 71*a*.

The second conductor section 81 is formed in a left portion of the patch conductor 60. The second conductor section 81 is formed in a left portion of the cutout section 60*a*. The second conductor section 81 is a conductor formed parallel to an X direction. One end of the second conductor section 81 and the connection conductor section 71*a* are electromagnetically connected by a connection conductor section 81*a*. The second conductor section 81 is shorter than the first conductor section 71.

The third conductor section 91 is formed between the second conductor section 81 and the cutout section 60*a*. The third conductor section 91 is a conductor that has one end electromagnetically connected to the patch conductor 60 and extends parallel to the X direction on a −X direction side. The third conductor section 91 is shorter than the second conductor section 81.

That is, lengths of the first conductor section 71, the second conductor section 81, and the third conductor section 91 are longer in the order of the first conductor section 71, the second conductor section 81, and the third conductor section 91. The first conductor section 71 is formed to be orthogonal to the second conductor section 81 and the third conductor section 91. The second conductor section 81 and the third conductor section 91 face each other. The second conductor section 81 and the third conductor section 91 are formed in parallel. The lengths of the first conductor section 71, the second conductor section 81, and the third conductor section 91 can be changed as desired depending on design.

The first conductor section 72 is formed in a right portion of the patch conductor 60.

The first conductor section 72 is formed in a right portion of the cutout section 60*b*. The first conductor section 72 is a conductor formed parallel to the X direction. One end of the first conductor section 72 and the patch conductor 60 are electromagnetically connected by a connection conductor section 72*a*.

The second conductor section 82 is formed in an upper right portion of the patch conductor 60. The second conductor section 82 is formed in an upper portion of the cutout section 60*b*. The second conductor section 82 is a conductor formed parallel to the Y direction. One end of the second conductor section 82 and the connection conductor section 72*a* are electromagnetically connected by a connection conductor section 82*a*. The second conductor section 82 is shorter than the first conductor section 72.

The third conductor section 92 is formed between the second conductor section 82 and the cutout section 60*b*. The third conductor section 92 is a conductor that has one end electromagnetically connected to the patch conductor 60 and extends parallel to the Y direction on a +Y direction side. The third conductor section 92 is shorter than the second conductor section 82.

That is, lengths of the first conductor section 72, the second conductor section 82, and the third conductor section 92 are longer in the order of the first conductor section 72, the second conductor section 82, and the third conductor section 92. The first conductor section 72 is formed to be orthogonal to the second conductor section 82 and the third conductor section 92. The second conductor section 82 and the third conductor section 92 face each other. The second conductor section 82 and the third conductor section 92 are formed in parallel. The lengths of the first conductor section 72, the second conductor section 82, and the third conductor section 92 can be changed as desired depending on design.

The first conductor section 73 is formed in a lower right portion of the patch conductor 60. The first conductor section 73 is formed in a lower portion of the cutout section 60*c*. The first conductor section 73 is a conductor formed parallel to the Y direction. One end of the first conductor section 73 and the patch conductor 60 are electromagnetically connected by a connection conductor section 73*a*.

The second conductor section 83 is formed in a right portion of the patch conductor 60. The second conductor section 83 is formed in a right portion of the cutout section 60*c*. The second conductor section 83 is a conductor formed parallel to the X direction. One end of the second conductor section 83 and the connection conductor section 73*a* are electromagnetically connected by a connection conductor section 83*a*. The second conductor section 83 is shorter than the first conductor section 73.

The third conductor section 93 is formed between the second conductor section 83 and the cutout section 60*c*. The third conductor section 93 is a conductor that has one end electromagnetically connected to the patch conductor 60 and extends parallel to the X direction on a +X direction side. The third conductor section 93 is shorter than the second conductor section 83.

That is, lengths of the first conductor section 73, the second conductor section 83, and the third conductor section 93 are longer in the order of the first conductor section 73, the second conductor section 83, and the third conductor section 93. The first conductor section 73 is formed to be orthogonal to the second conductor section 83 and the third conductor section 93. The second conductor section 83 and the third conductor section 93 face each other. The second conductor section 83 and the third conductor section 93 are formed in parallel. The lengths of the first conductor section 73, the second conductor section 83, and the third conductor section 93 can be changed as desired depending on design.

The first conductor section 74 is formed in a left portion of the patch conductor 60. The first conductor section 74 is formed in a left portion of the cutout section 60*d*. The first conductor section 74 is a conductor formed parallel to the X direction. One end of the first conductor section 74 and the patch conductor 60 are electromagnetically connected by a connection conductor section 74*a*.

The second conductor section 84 is formed in a lower left portion of the patch conductor 60. The second conductor section 84 is formed in a lower portion of the cutout section 60*d*. The second conductor section 84 is a conductor formed parallel to the Y direction. One end of the second conductor section 84 and the connection conductor section 74*a* are electromagnetically connected by a connection conductor section 84*a*. The second conductor section 84 is shorter than the first conductor section 74.

The third conductor section 94 is formed between the second conductor section 84 and the cutout section 60*d*. The third conductor section 94 is a conductor that has one end electromagnetically connected to the patch conductor 60 and extends parallel to the Y direction on a −Y direction side. The third conductor section 94 is shorter than the second conductor section 84.

That is, lengths of the first conductor section 74, the second conductor section 84, and the third conductor section 94 are longer in the order of the first conductor section 74, the second conductor section 84, and the third conductor section 94. The first conductor section 74 is formed to be orthogonal to the second conductor section 84 and the third conductor section 94. The second conductor section 84 and the third conductor section 94 face each other. The second conductor section 84 and the third conductor section 94 are formed in parallel. The lengths of the first conductor section 74, the second conductor section 84, and the third conductor section 94 can be changed as desired depending on design.

Figure 16:
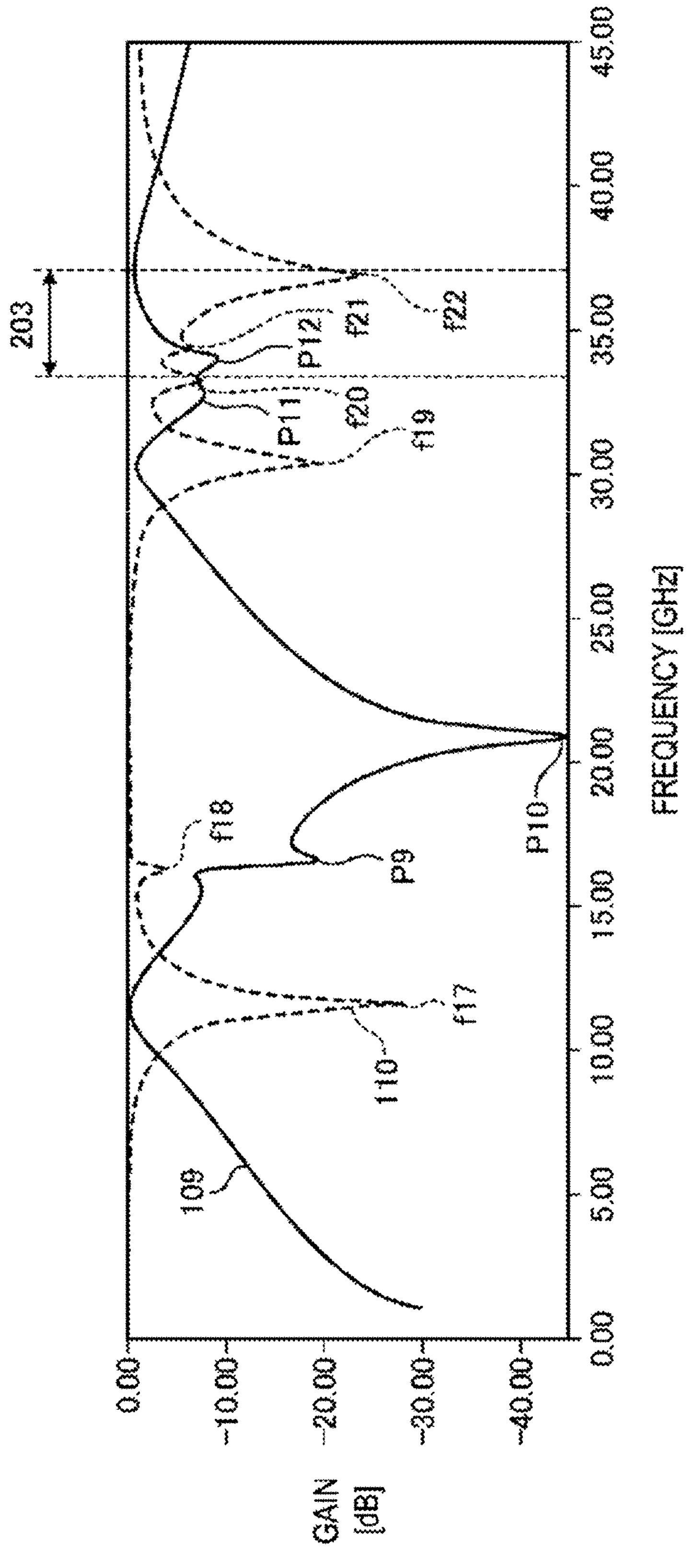
FIG. 16 is a diagram showing a reflection characteristic and a transmission characteristic of the unit structure according to the fifth embodiment.

FIG. 16 is a diagram showing a reflection characteristic and a transmission characteristic of the unit structure according to the fifth embodiment.

In FIG. 16, a horizontal axis represents a frequency [GHz] and a vertical axis represents a gain [dB]. A graph 109 shows a transmission characteristic of the unit structure according to the fifth embodiment. A graph 110 shows a reflection characteristic of the unit structure according to the fifth embodiment.

As indicated by the graph 109, the unit structure according to the fifth embodiment has four attenuation poles, including an attenuation pole P9, an attenuation pole P10, an attenuation pole P11, and an attenuation pole P12 in the transmission characteristic.

As indicated by the graph 110, the unit structure according to the fifth embodiment has six resonant frequencies, namely, a first resonant frequency f17, a second resonant frequency f18, a third resonant frequency f19, a fourth resonant frequency f20, a fifth resonant frequency f21, and a sixth resonant frequency f22.

The first resonant structure 11F includes different sections that function as resonators in response to a frequency of radio waves received from the outside.

States of resonance of the unit structure according to the fifth embodiment will be described with reference to FIGS. 17A, 17B, 17C, 17D, 17E, and 17F. FIGS. 17A to 17F show the magnetic field strength [ampere per meter (A/m)] of the first resonant structure 11F for the first frequency to the sixth frequency, respectively. In FIGS. 17A to 17F, the stronger the magnetic field strength is, the darker the color is shown.

Figure 17A:
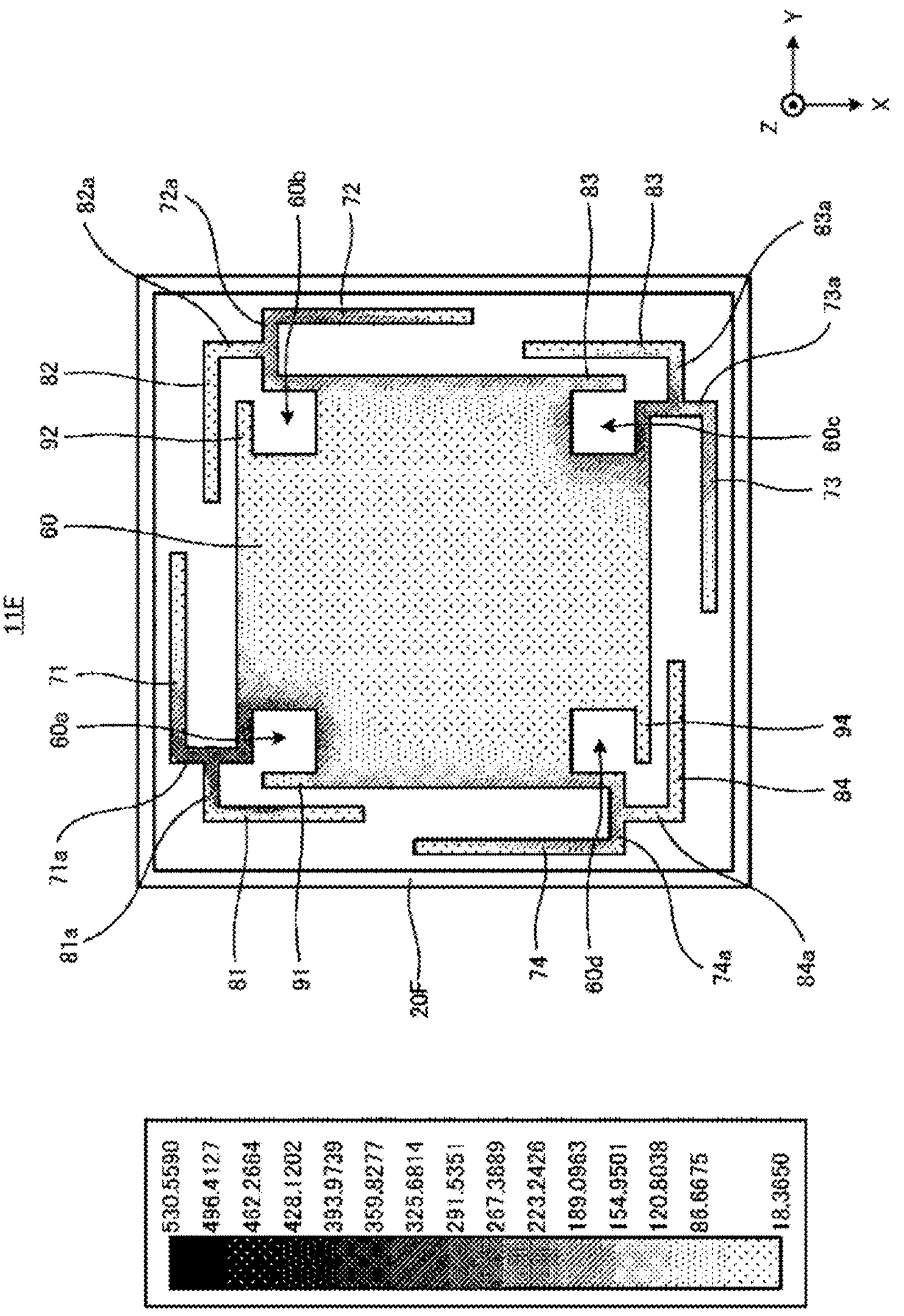
FIG. 17A is a diagram illustrating a simulation result showing strength of a magnetic field of the unit structure for radio waves of a first frequency according to the fifth embodiment.

FIG. 17A is a diagram illustrating a simulation result showing strength of a magnetic field of the unit structure for radio waves of the first frequency according to the fifth embodiment. As shown in FIG. 16, the first resonant frequency f17 is approximately 11.6 GHz. In this case, as illustrated in FIG. 17A, the magnetic field is relatively strong in the first conductor section 71, the connection conductor section 71*a*, a periphery of the cutout section 60*a*, the first conductor section 73, the connection conductor section 73*a*, and a periphery of the cutout section 60*c*. That is, the first conductor section 71, the connection conductor section 71*a*, the periphery of the cutout section 60*a*, the first conductor section 73, the connection conductor section 73*a*, and the periphery of the cutout section 60*c* function as resonators for the first resonant frequency f17.

Figure 17B:
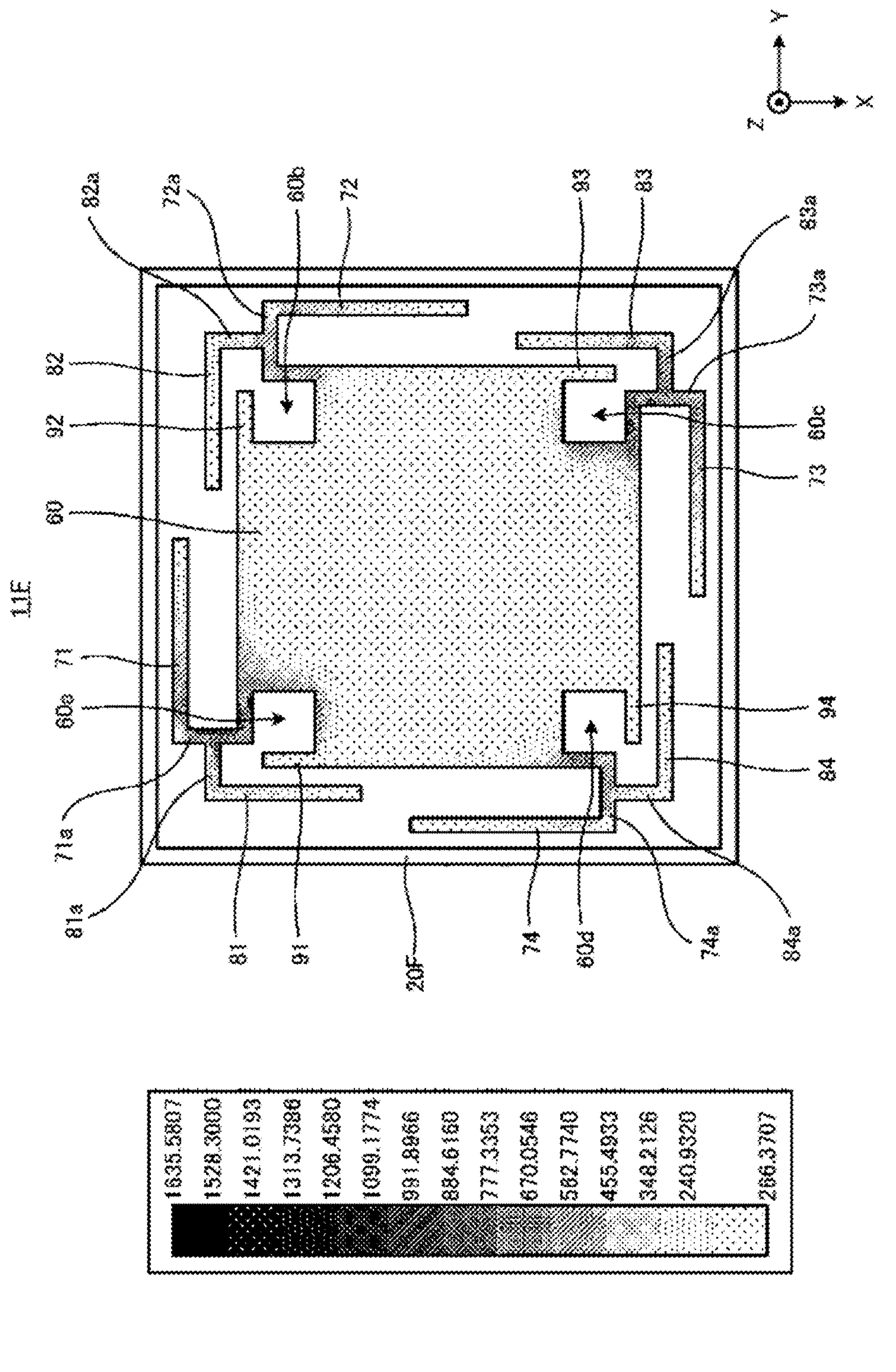
FIG. 17B is a diagram illustrating a simulation result showing strength of a magnetic field of the unit structure for radio waves of a second frequency according to the fifth embodiment.

FIG. 17B is a diagram illustrating a simulation result showing strength of a magnetic field of the unit structure for radio waves of the second frequency according to the fifth embodiment. As shown in FIG. 16, the second resonant frequency f18 is approximately 16.3 GHz. In this case, as illustrated in FIG. 17B, the magnetic field is relatively strong in the first conductor section 71, the connection conductor section 71*a*, a periphery of the cutout section 60*a*, the first conductor section 73, the connection conductor section 73*a*, and a periphery of the cutout section 60*c*. That is, the first conductor section 71, the connection conductor section 71*a*, the periphery of the cutout section 60*a*, the first conductor section 73, the connection conductor section 73*a*, and the periphery of the cutout section 60*c* function as resonators for the second resonant frequency f18.

Figure 17C:
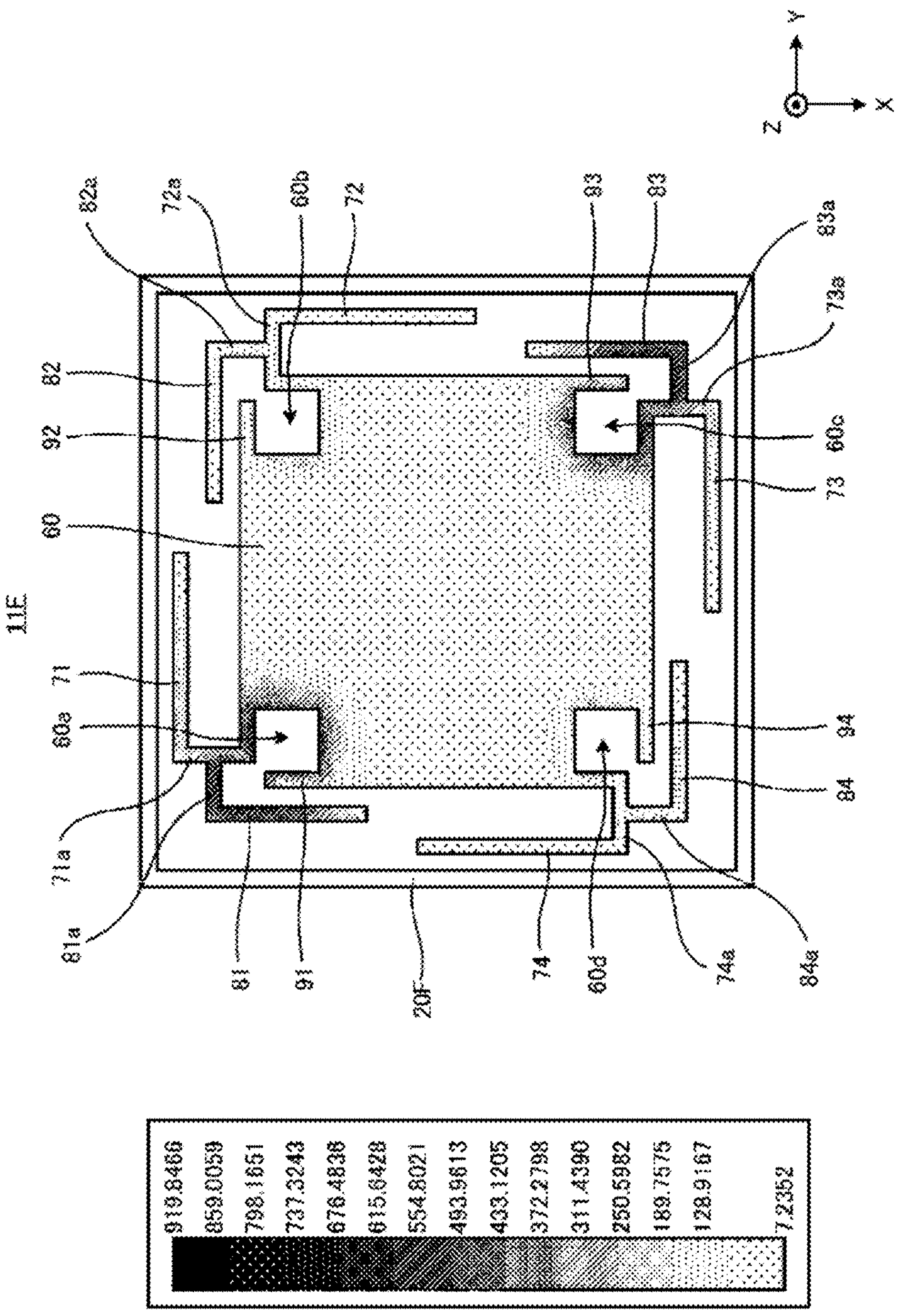
FIG. 17C is a diagram illustrating a simulation result showing strength of a magnetic field of the unit structure for radio waves of a third frequency according to the fifth embodiment.

FIG. 17C is a diagram illustrating a simulation result showing strength of a magnetic field of the unit structure for radio waves of the third frequency according to the fifth embodiment. As shown in FIG. 16, the third resonant frequency f19 is approximately 30.4 GHz. In this case, as illustrated in FIG. 17C, the magnetic field is relatively strong in the second conductor section 81, the connection conductor section 81*a*, a periphery of the cutout section 60*a*, the second conductor section 83, the connection conductor section 83*a*, and a periphery of the cutout section 60*c*. That is, the second conductor section 81, the connection conductor section 81*a*, the periphery of the cutout section 60*a*, the second conductor section 83, the connection conductor section 83*a*, and the periphery of the cutout section 60*c* function as resonators for the third resonant frequency f19.

Figure 17D:
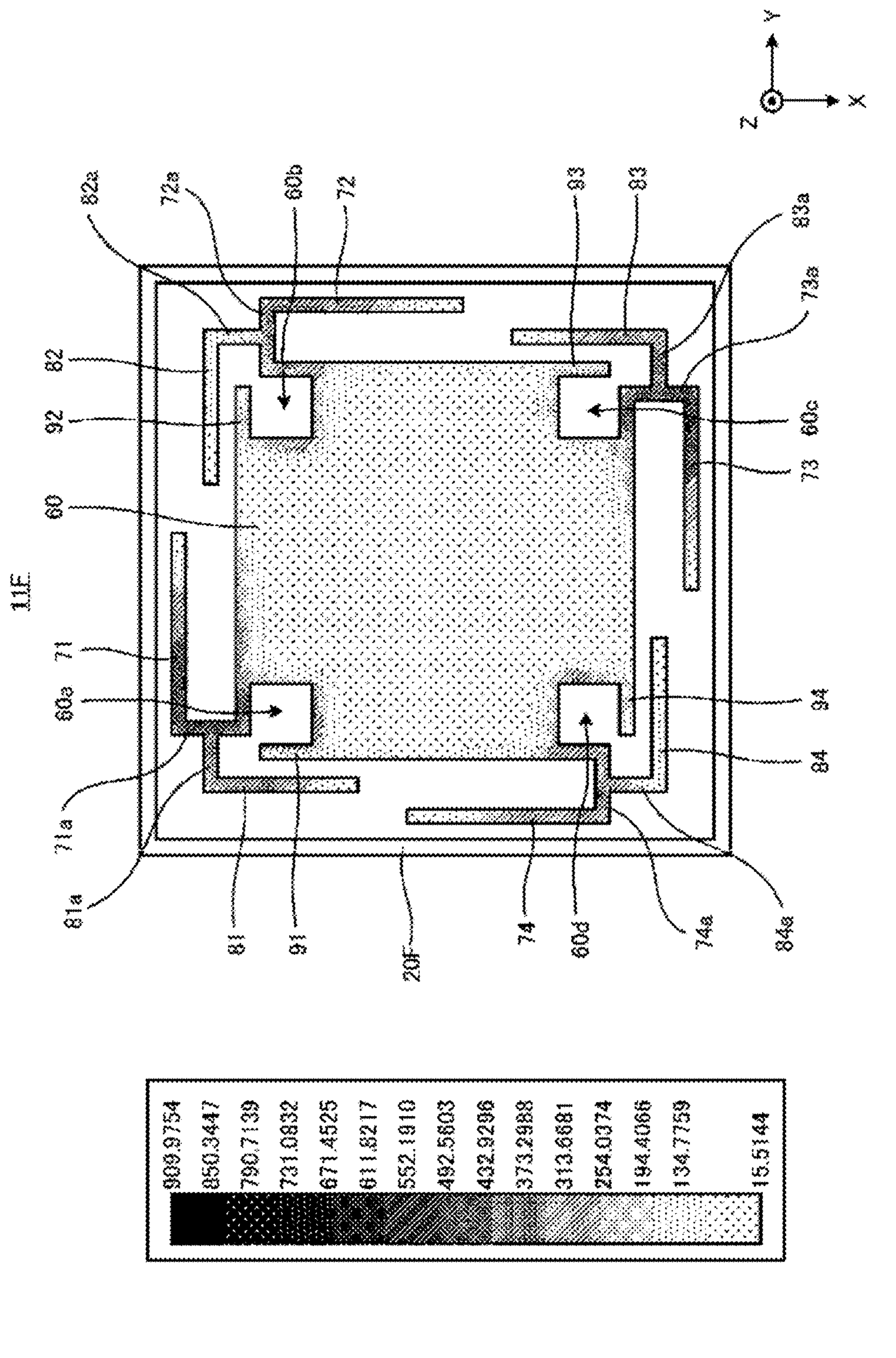
FIG. 17D is a diagram illustrating a simulation result showing strength of a magnetic field of the unit structure for radio waves of a fourth frequency according to the fifth embodiment.

FIG. 17D is a diagram illustrating a simulation result showing strength of a magnetic field of the unit structure for radio waves of the fourth frequency according to the fifth embodiment. As shown in FIG. 16, the fourth resonant frequency f20 is approximately 33.1 GHz. In this case, as illustrated in FIG. 17D, the magnetic field is relatively strong in the first conductor section 71, the second conductor section 81, the connection conductor section 71*a*, the connection conductor section 81*a*, the first conductor section 72, the connection conductor section 72*a*, the second conductor section 83, the connection conductor section 73*a*, the connection conductor section 83*a*, the first conductor section 74, and the connection conductor section 74*a*. That is, the first conductor section 71, the second conductor section 81, the connection conductor section 71*a*, the connection conductor section 81*a*, the first conductor section 72, the connection conductor section 72*a*, the second conductor section 83, the connection conductor section 73*a*, the connection conductor section 83*a*, the first conductor section 74, and the connection conductor section 74*a* function as resonators for the fourth resonant frequency f20.

Figure 17E:
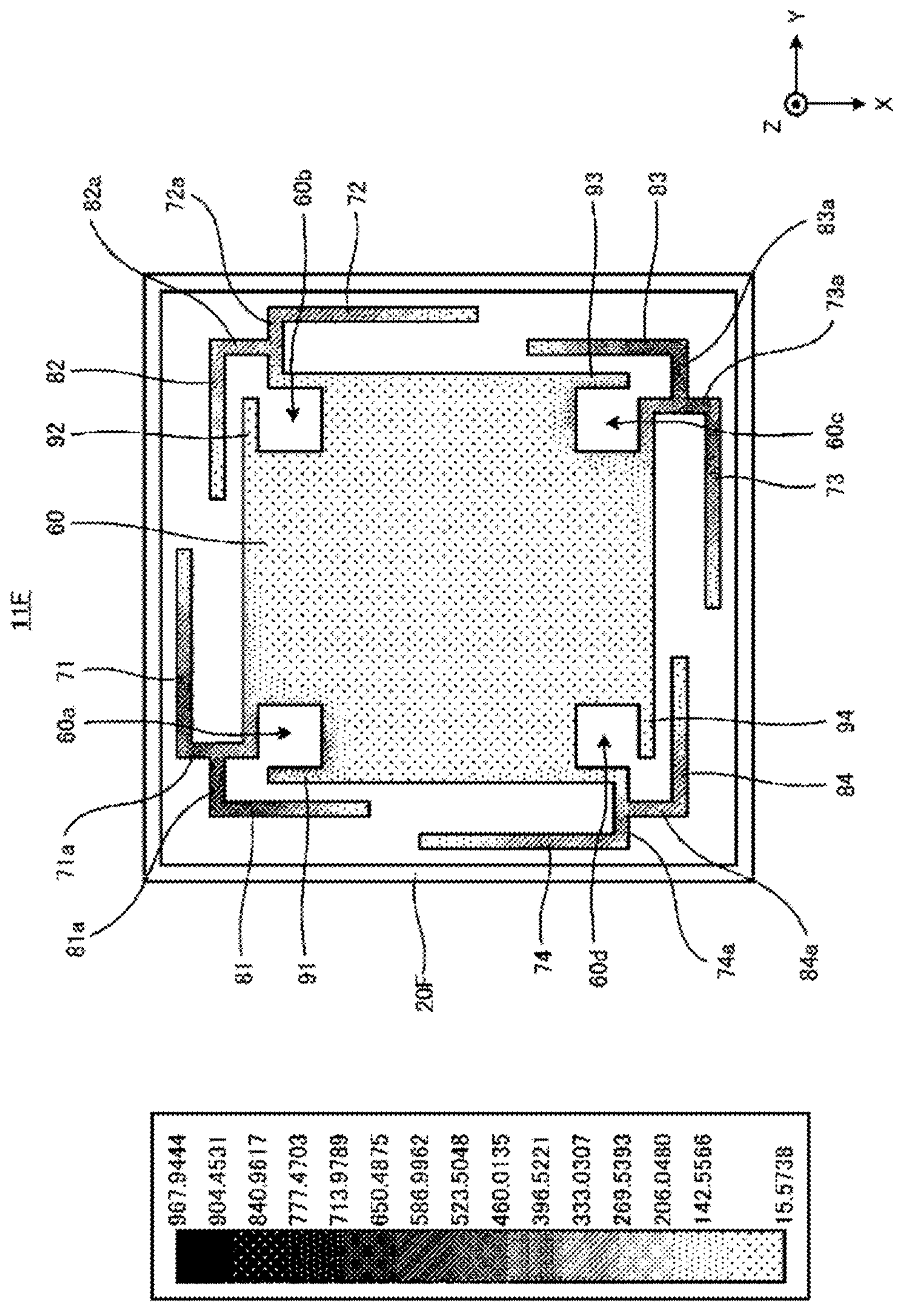
FIG. 17E is a diagram illustrating a simulation result showing strength of a magnetic field of the unit structure for radio waves of a fifth frequency according to the fifth embodiment.

FIG. 17E is a diagram illustrating a simulation result showing strength of a magnetic field of the unit structure for radio waves of the fifth frequency according to the fifth embodiment. As shown in FIG. 16, the fifth resonant frequency f21 is approximately 34.5 GHz. In this case, as illustrated in FIG. 17E, the magnetic field is relatively strong in the first conductor section 71, the second conductor section 81, the connection conductor section 71*a*, the connection conductor section 81*a*, the first conductor section 73, the second conductor section 83, the connection conductor section 73*a*, and the connection conductor section 83*a*.

That is, the first conductor section 71, the second conductor section 81, the connection conductor section 71*a*, the connection conductor section 81*a*, the first conductor section 73, the second conductor section 83, the connection conductor section 73*a*, and the connection conductor section 83*a* function as resonators for the fifth resonant frequency f21.

Figure 17F:
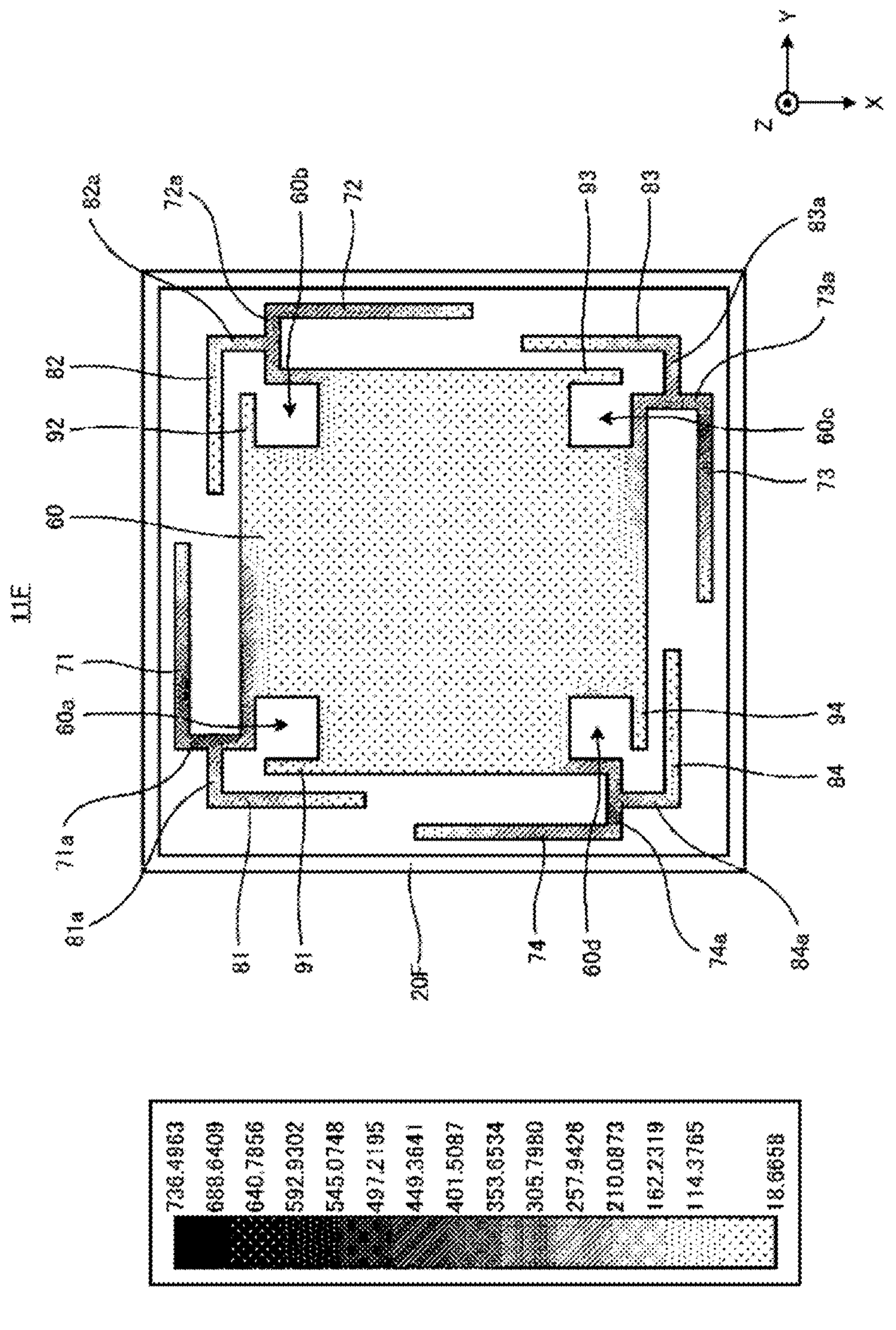
FIG. 17F is a diagram illustrating a simulation result showing strength of a magnetic field of the unit structure for radio waves of a sixth frequency according to the fifth embodiment.

FIG. 17F is a diagram illustrating a simulation result showing strength of a magnetic field of the unit structure for radio waves of the sixth frequency according to the fifth embodiment. As shown in FIG. 16, the sixth resonant frequency f22 is approximately 36.9 GHz. In this case, as illustrated in FIG. 17F, the magnetic field is relatively strong in the first conductor section 71, the connection conductor section 71*a*, the first conductor section 72, the connection conductor section 72*a*, the first conductor section 73, the connection conductor section 73*a*, the first conductor section 74, and the connection conductor section 74*a*. That is, the first conductor section 71, the connection conductor section 71*a*, the first conductor section 72, the connection conductor section 72*a*, the first conductor section 73, the connection conductor section 73*a*, the first conductor section 74, and the connection conductor section 74*a* function as resonators for the sixth resonant frequency f22.

Again, FIG. 16 is referenced. The attenuation pole P11 and the attenuation pole P12 are formed between the third resonant frequency f19 and the sixth resonant frequency f22. The attenuation pole P11 is formed in a frequency band between the third resonant frequency f19 and the fourth resonant frequency f20. The attenuation pole P12 is formed between the fourth resonant frequency f20 and the fifth resonant frequency f21. By adjusting the third resonant frequency f19 to the sixth resonant frequency f22, positions of the attenuation pole P11 and the attenuation pole P12 can be adjusted. Thus, a region 203 in which the reflection characteristic is −10 dB or less can be formed. The region 203 serves as a pass band of a bandpass filter. The region 203 is, for example, a band from about 33.00 GHz to 37.00 GHZ, but is not limited thereto.

Figure 18:
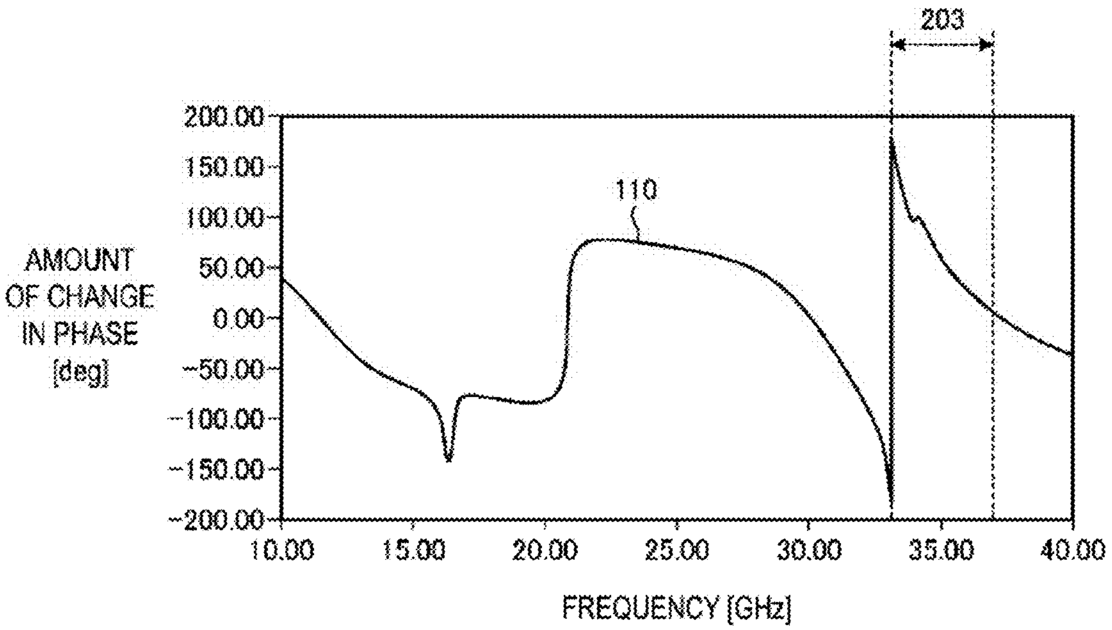
FIG. 18 is a diagram showing an amount of change in phase of the unit structure according to the fifth embodiment.

FIG. 18 is a diagram showing an amount of change in phase of the unit structure according to the fifth embodiment. As shown in FIG. 18, the unit structure according to the fifth embodiment can change a phase of radio waves in a range from 180° to 0° in the region 203. By using the unit structure according to the fifth embodiment, a configuration of the radio wave control plate can be made thinner.

OTHER EMBODIMENTS

Resonant Structure

Figure 19:
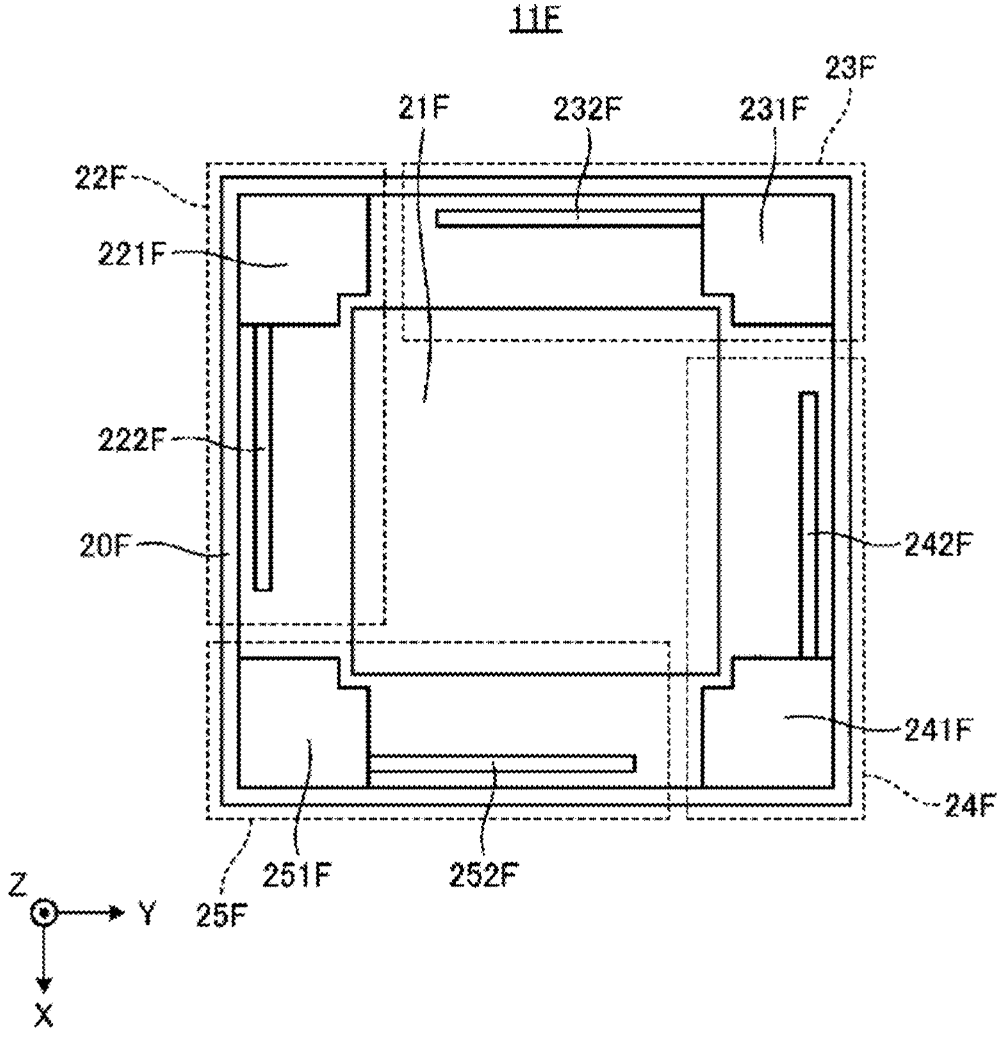
FIG. 19 is a diagram illustrating a configuration example of a first resonant structure according to another embodiment.
Figure 20:
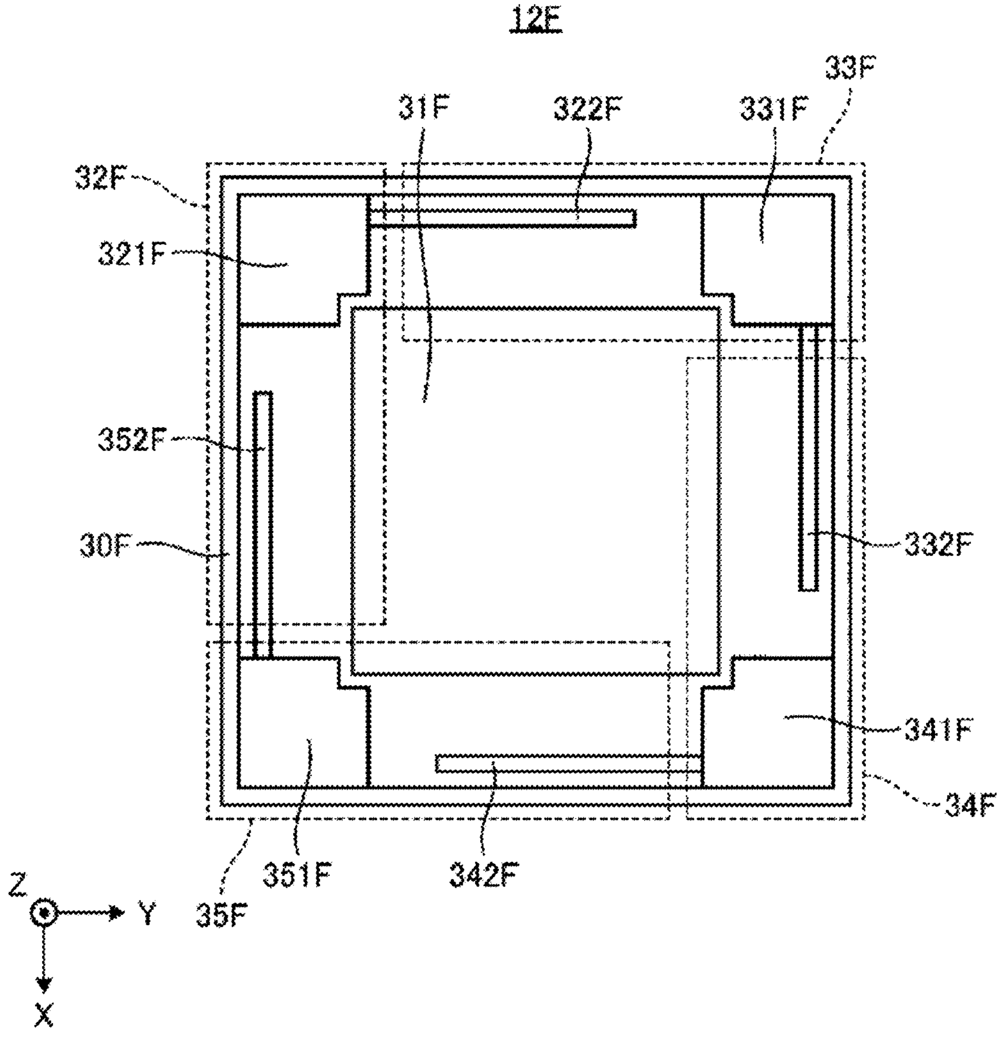
FIG. 20 is a diagram illustrating a configuration example of a second resonant structure according to still another embodiment.

A resonant structure according to another embodiment will be described with reference to FIGS. 19 and 20. FIG. 19 is a diagram illustrating a configuration example of a first resonant structure according to the other embodiment. FIG. 20 is a diagram illustrating a configuration example of a second resonant structure according to the other embodiment. A unit structure according to the other embodiment has a two-layer structure in which a first resonant structure 11F is placed on an upper surface and a second resonant structure 12F is placed on a lower surface.

As illustrated in FIG. 19, the first resonant structure 11F includes a reference conductor 20F, a first resonator 21F, a second resonator 22F, a second resonator 23F, a second resonator 24F, and a second resonator 25F. In the first resonant structure 11F, the reference conductor 20F, the first resonator 21F, the second resonator 22F, the second resonator 23F, the second resonator 24F, and the second resonator 25F are formed on the same XY plane.

The reference conductor 20F is the same as and/or similar to the reference conductor 20 illustrated in FIG. 3, description thereof will be omitted. The first resonator 21F is the same as and/or similar to the first resonator 21 illustrated in FIG. 3, description thereof will be omitted.

The second resonator 22F is made of a conductor. The second resonator 22F is formed, for example, in an upper left corner portion of the inner circumference of the reference conductor 20F. The second resonator 22F is formed on an XY plane. The second resonator 22F includes a first conductor section 221F and a second conductor section 222F. The first conductor section 221F is formed in a rectangular shape. A left side and an upper side of the first conductor section 221F are electromagnetically connected to the reference conductor 20F. A lower right corner portion of the first conductor section 221F is cut out. One end of the second conductor section 222F is electromagnetically connected to a lower side of the first conductor section 221F. The second conductor section 222F extends parallel to an X direction on a +X direction side. The second resonator 22F serves as a λ/4 resonator.

The second resonator 23F is made of a conductor. The second resonator 23F is formed, for example, in an upper right corner portion of the inner circumference of the reference conductor 20F. The second resonator 23F is formed on the XY plane. The second resonator 23F includes a first conductor section 231F and a second conductor section 232F. The first conductor section 231F is formed in a rectangular shape. A right side and an upper side of the first conductor section 231F are electromagnetically connected to the reference conductor 20F. A lower left corner portion of the first conductor section 231F is cut out. One end of the second conductor section 232F is electromagnetically connected to a left side of the first conductor section 231F. The second conductor section 232F extends parallel to a Y direction on a −Y direction side. The second resonator 23F serves as a λ/4 resonator.

The second resonator 24F is made of a conductor. The second resonator 24F is formed, for example, in a lower right corner portion of the inner circumference of the reference conductor 20F. The second resonator 24F is formed on the XY plane. The second resonator 24F includes a first conductor section 241F and a second conductor section 242F. The first conductor section 241F is formed in a rectangular shape. A right side and a lower side of the first conductor section 241F are electromagnetically connected to the reference conductor 20F. An upper left corner portion of the first conductor section 241F is cut out. One end of the second conductor section 242F is electromagnetically connected to an upper side of the first conductor section 241F. The second conductor section 242F extends parallel to the X direction on a −X direction side. The second resonator 24F serves as a λ/4 resonator.

The second resonator 25F is made of a conductor. The second resonator 25F is formed, for example, in a lower left corner portion of the inner circumference of the reference conductor 20F. The second resonator 25F is formed on the XY plane. The second resonator 25F includes a first conductor section 251F and a second conductor section 252F. The first conductor section 251F is formed in a rectangular shape. A left side and a lower side of the first conductor section 251F are electromagnetically connected to the reference conductor 20F. An upper right corner portion of the first conductor section 251F is cut out. One end of the second conductor section 252F is electromagnetically connected to a right side of the first conductor section 251F. The second conductor section 252F extends parallel to the Y direction on a +Y direction side. The second resonator 25F serves as a λ/4 resonator.

The second resonator 22F, the second resonator 23F, the second resonator 24F, and the second resonator 25F have the same shape.

In the first resonant structure 11F, two different types of resonators, a λ/2 resonator and λ/4 resonators, are formed on the same plane.

As illustrated in FIG. 20, the second resonant structure 12F includes a reference conductor 30F, a first resonator 31F, a second resonator 32F, a second resonator 33F, a second resonator 34F, and a second resonator 35F. In the second resonant structure 12F, the reference conductor 30F, the first resonator 31F, the second resonator 32F, the second resonator 33F, the second resonator 34F, and the second resonator 35F are formed on the same XY plane.

The reference conductor 30F is the same as and/or similar to the reference conductor 30 illustrated in FIG. 4, description thereof will be omitted. The first resonator 31F is the same as and/or similar to the first resonator 31 illustrated in FIG. 4, description thereof will be omitted.

The second resonator 32F is made of a conductor. The second resonator 32F is formed, for example, in an upper left corner portion of the inner circumference of the reference conductor 30F. The second resonator 32F is formed on the XY plane. The second resonator 32F includes a first conductor section 321F and a second conductor section 322F. The first conductor section 321F is formed in a rectangular shape. A left side and an upper side of the first conductor section 321F are electromagnetically connected to the reference conductor 30F. A lower right corner portion of the first conductor section 321F is cut out. One end of the second conductor section 322F is electromagnetically connected to a right side of the first conductor section 321F. The second conductor section 322F extends parallel to the Y direction on the +Y direction side. The second resonator 32F serves as a λ/4 resonator.

The second resonator 33F is made of a conductor. The second resonator 33F is formed, for example, in an upper right corner portion of the inner circumference of the reference conductor 30F. The second resonator 33F is formed on the XY plane. The second resonator 33F includes a first conductor section 331F and a second conductor section 332F. The first conductor section 331F is formed in a rectangular shape. A right side and an upper side of the first conductor section 331F are electromagnetically connected to the reference conductor 30F. A lower left corner portion of the first conductor section 331F is cut out. One end of the second conductor section 332F is electromagnetically connected to a lower side of the first conductor section 331F. The second conductor section 332F extends parallel to the X direction on the +X direction side. The second resonator 33F serves as a λ/4 resonator.

The second resonator 34F is made of a conductor. The second resonator 34F is formed, for example, in a lower right corner portion of the inner circumference of the reference conductor 30F. The second resonator 34F is formed on the XY plane. The second resonator 34F includes a first conductor section 341F and a second conductor section 342F. The first conductor section 341F is formed in a rectangular shape. A right side and a lower side of the first conductor section 341F are electromagnetically connected to the reference conductor 30F. An upper left corner portion of the first conductor section 341F is cut out. One end of the second conductor section 342F is electromagnetically connected to a left side of the first conductor section 341F. The second conductor section 342F extends parallel to the Y direction on the −Y direction side. The second resonator 34F serves as a λ/4 resonator.

The second resonator 35F is made of a conductor. The second resonator 35F is formed, for example, in a lower left corner portion of the inner circumference of the reference conductor 30F. The second resonator 35F is formed on the XY plane. The second resonator 35F includes a first conductor section 351F and a second conductor section 352F. The first conductor section 351F is formed in a rectangular shape. A left side and a lower side of the first conductor section 351F are electromagnetically connected to the reference conductor 30F. An upper right corner portion of the first conductor section 351F is cut out. One end of the second conductor section 352F is electromagnetically connected to a upper side of the first conductor section 351F. The second conductor section 352F extends parallel to the X direction on the −X direction side. The second resonator 35F serves as a λ/4 resonator.

The first conductor section 221F and the first conductor section 321F are formed so as to face each other. The first conductor section 231F and the first conductor section 331F are formed so as to face each other. The first conductor section 241F and the first conductor section 341F are formed so as to face each other. The first conductor section 251F and the first conductor section 351F are formed so as to face each other.

The second conductor section 222F and the second conductor section 352F are formed so as to partially face each other. The second conductor section 232F and the second conductor section 322F are formed so as to partially face each other. The second conductor section 242F and the second conductor section 332F are formed so as to partially face each other. The second conductor section 252F and the second conductor section 342F are formed so as to partially face each other.

Figure 21:
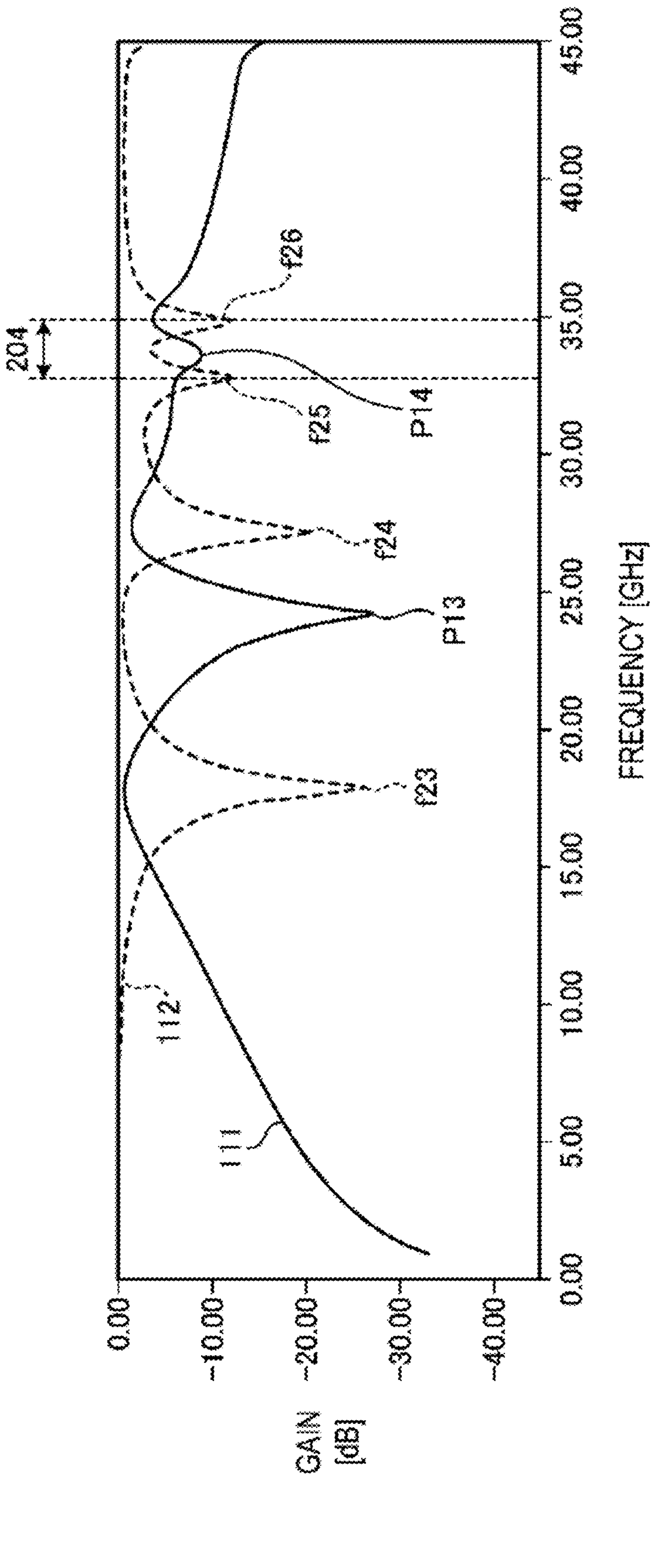
FIG. 21 is a diagram showing a reflection characteristic and a transmission characteristic of a unit structure according to still another embodiment.
Figure 22:
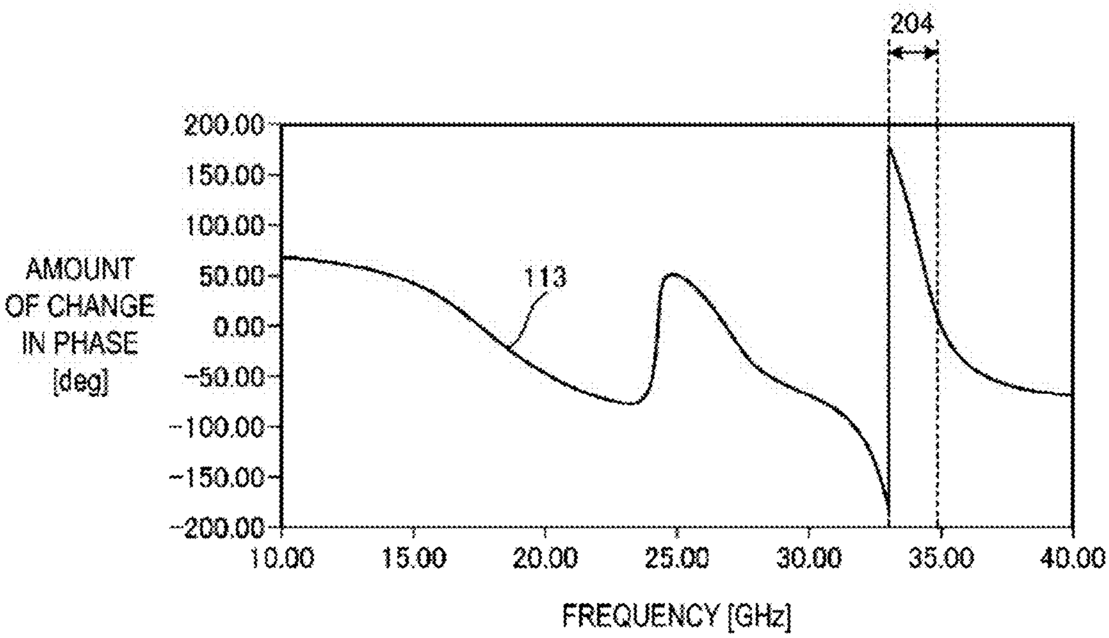
FIG. 22 is a diagram showing an amount of change in phase of the unit structure according to still another embodiment.

Characteristics of the unit structure according to the other embodiment will be described with reference to FIGS. 21 and 22. FIG. 21 is a diagram showing a reflection characteristic and a transmission characteristic of the unit structure according to the other embodiment. FIG. 22 is a diagram showing an amount of change in phase of the unit structure according to the other embodiment.

In FIG. 21, a horizontal axis represents a frequency [GHz] and a vertical axis represents a gain [dB]. A graph 111 shows a transmission characteristic of the unit structure according to the other embodiment. A graph 112 shows a reflection characteristic of the unit structure according to the other embodiment.

As indicated by the graph 111, the unit structure according to the other embodiment has two attenuation poles, namely, an attenuation pole P13 and an attenuation pole P14, in the transmission characteristic.

As indicated by the graph 112, the unit structure according to the other embodiment has a first resonant frequency f23, a second resonant frequency f24, a third resonant frequency f25, and a fourth resonant frequency f26.

The attenuation pole P13 and the attenuation pole P14 are formed in a frequency band between the first resonant frequency f23 and the fourth resonant frequency f26. The attenuation pole P13 is formed in a frequency band between the first resonant frequency f23 and the second resonant frequency f24. The attenuation pole P14 is formed in a frequency band between the third resonant frequency f25 and the fourth resonant frequency f26. By adjusting from the third resonant frequency f23 to the fourth resonant frequency f26, positions of the attenuation pole P13 and the attenuation pole P14 can be adjusted. Thus, a region 204 in which the reflection characteristic is −10 dB or less can be formed. The region 204 serves as a pass band of a bandpass filter. The region 204 is, for example, a band from about 33.00 GHz to 35.00 GHz, but is not limited thereto.

FIG. 22 is a diagram showing an amount of change in phase of the unit structure according to the other embodiment. As shown in FIG. 22, the unit structure according to the other embodiment can change a phase of radio waves in a range from 180° to 0° in the region 204. By using the unit structure according to the other embodiment, a configuration of the radio wave control plate can be made thinner.

Embodiments of the present disclosure have been described above, but the present disclosure is not limited to the contents of the embodiments. Constituent elements described above include those that can be easily assumed by a person skilled in the art, those that are substantially identical to the constituent elements, and those within a so-called range of equivalency. The constituent elements described above can be combined as appropriate. Various omissions, substitutions, or modifications of the constituent elements can be made without departing from the spirit of the above-described embodiments.

REFERENCE SIGNS

- 1 Radio wave refracting plate
- 2 Substrate
- 10, 10A, 10B, 10C, 10D Unit structure
- 11, 11C First resonant structure
- 12, 12C Second resonant structure
- 20, 20A, 20B, 20C, 20F, 30, 30A, 30B, 30C, 30F Reference conductor
- 21, 21A, 21B, 21C, 21D, 21F, 31, 31A, 31B, 31C, 31D, 31F First resonator
- 22, 22A, 22B, 22F, 23, 23A, 23B, 23F, 24, 24A, 24B, 24F, 25, 25A, 25B, 25F, 32, 32A, 32B, 32F, 33, 33A, 33B, 33F, 34, 34A, 34B, 34F, 35, 35A, 35B, 35F Second resonator
- 40, 41, 42, 43, 44, 45 Resonator
- 60 Patch conductor
- 60*a*, 60*b*, 60*c*, 60*d* Cutout section
- 71, 72, 73, 74 First conductor section
- 81, 82, 83, 84 Second conductor section
- 91, 92, 93, 94 Third conductor section

The invention claimed is:

1. A radio wave control plate comprising:

a plurality of unit structures arrayed in a first plane direction; and a reference conductor serving as a reference potential of the plurality of unit structures, wherein each of the plurality of unit structures comprises a first resonant structure and a second resonant structure being rotationally symmetric in the first plane direction, each of the first resonant structure and the second resonant structure comprising a first resonator extending in the first plane direction and second resonators formed on the same plane as the first resonator and electromagnetically connected to the reference conductor, and the first resonant structure and the second resonant structure are spaced apart from each other in a first direction, and the first resonator and the second resonators of the first resonant structure correspondingly face the first resonator and the second resonators of the second resonant structure.

2. The radio wave control plate according to claim 1, wherein the first resonator is a λ/2 resonator, and the second resonators are λ/4 resonators.

3. The radio wave control plate according to claim 1, wherein the reference conductor is placed on the same plane as the first resonator and the second resonators, and surrounds the first resonator and the second resonators, and the second resonators are electromagnetically connected to the reference conductor.

4. The radio wave control plate according to claim 3, wherein the first resonator is placed inside the second resonators.

5. The radio wave control plate according to claim 1, wherein the second resonators have a rotationally symmetric shape in the first plane direction.

6. The radio wave control plate according to claim 5, wherein the reference conductor is a rectangular frame body, and the second resonators are placed at four corners of the reference conductor.

7. The radio wave control plate according to claim 6, wherein the second resonators are formed in a hairpin shape.

8. The radio wave control plate according to claim 6, wherein the second resonators of the first resonant structure and the second resonators of the second resonant structure have the same shape, and are formed with each of the second resonators of the first resonant structure and the corresponding one of the second resonators of the second resonant structure facing, and rotated relative to, each other.

9. The radio wave control plate according to claim 6, wherein the first resonator is a patch conductor.

10. The radio wave control plate according to claim 9, wherein the first resonator has a hole.

11. The radio wave control plate according to claim 1, wherein the first resonator and the second resonators are λ/2 resonators.

12. The radio wave control plate according to claim 11, wherein each of the λ/2 resonators comprises a cutout section, a first conductor section, a second conductor section shorter than the first conductor section, and a third conductor section shorter than the second conductor section, the first conductor section, the second conductor section, and the third conductor section being provided around the cutout section, the second conductor section and the third conductor section are formed in parallel and face each other, and the first conductor section is formed to be orthogonal to the second conductor section and the third conductor section.

13. A radio wave control plate comprising:

a plurality of unit structures arrayed in a first plane direction; and a reference conductor serving as a reference potential of the plurality of unit structures, wherein each of the plurality of unit structures comprises a first resonant structure and a second resonant structure, each of the first resonant structure and the second resonant structure comprising a λ/2 resonator extending in the first plane direction and λ/4 resonators formed on the same plane as the λ/2 resonator and electromagnetically connected to the reference conductor, and the first resonant structure and the second resonant structure are spaced apart from each other in a first direction, and the λ/2 resonator and the λ/4 resonators of the first resonant structure correspondingly face the λ/2 resonator and the λ/4 resonators of the second resonant structure.

14. The radio wave control plate according to claim 13, wherein the radio wave control plate has two or more resonant frequencies and is configured to form a pass band of a bandpass filter using some of the two or more resonant frequencies.

15. The radio wave control plate according to claim 13, wherein the radio wave control plate has four resonant frequencies, including a first resonant frequency, a second resonant frequency, a third resonant frequency, and a fourth resonant frequency in order from a low frequency side, and is configured to form a pass band of a bandpass filter using two resonant frequencies on a high frequency side.

16. A radio wave control plate comprising:

a plurality of first unit structures arrayed in a first plane direction;

a plurality of second unit structures arrayed in the first plane direction; and a reference conductor serving as a reference potential of the plurality of first unit structures and the plurality of second unit structures, wherein each of the plurality of first unit structures comprises a first resonant structure and a second resonant structure, each of the first resonant structure and the second resonant structure comprising a λ/2 resonator extending in the first plane direction and λ/4 resonators formed on the same plane as the λ/2 resonator and electromagnetically connected to the reference conductor, the first resonant structure and the second resonant structure are spaced apart from each other in a first direction, and the λ/2 resonator and the λ/4 resonators of the first resonant structure correspondingly face the λ/2 resonator and the λ/4 resonators of the second resonant structure, each of the plurality of second unit structures comprises a first patch conductor and a second patch conductor extending in the first plane direction, and the first patch conductor and the second patch conductor are spaced apart from and face each other in the first direction.

* * * * *